United States Patent
Parker et al.

(10) Patent No.: US 9,605,126 B2
(45) Date of Patent: *Mar. 28, 2017

(54) ULTRAFILTRATION PROCESS FOR THE RECOVERY OF CONCENTRATED SULFOPOLYESTER DISPERSION

(71) Applicant: Eastman Chemical Company, Kingsport, TN (US)

(72) Inventors: Kenny Randolph Parker, Afton, TN (US); Shane Kipley Kirk, Church Hill, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/108,390

(22) Filed: Dec. 17, 2013

(65) Prior Publication Data

US 2015/0166758 A1 Jun. 18, 2015

(51) Int. Cl.
*C08J 11/06* (2006.01)
*B01D 61/14* (2006.01)

(52) U.S. Cl.
CPC .............. *C08J 11/06* (2013.01); *B01D 61/145* (2013.01); *B01D 2315/10* (2013.01); *C08J 2367/02* (2013.01); *Y02W 30/701* (2015.05)

(58) Field of Classification Search
CPC ....... C08J 11/06; C08J 2367/06; B01D 21/00; B01D 61/145; B01D 2315/10; Y02W 30/701
USPC .................................................. 528/480–503
See application file for complete search history.

(56) References Cited

U.S. PATENT DOCUMENTS

| | | |
|---|---|---|
| 1,814,155 A | 7/1931 | Haughey |
| 2,862,251 A | 12/1958 | Kalwaites |
| 2,999,788 A | 9/1961 | Morgan |
| 3,018,272 A | 1/1962 | Griffing et al. |
| 3,033,822 A | 5/1962 | Kibler et al. |
| 3,049,469 A | 8/1962 | Davison et al. |
| 3,075,952 A | 1/1963 | Coover et al. |
| 3,372,084 A | 3/1968 | Hanns |
| 3,485,706 A | 12/1969 | Evans |
| 3,528,947 A | 9/1970 | Lappin et al. |
| 3,556,932 A | 1/1971 | Coscia et al. |

(Continued)

FOREIGN PATENT DOCUMENTS

| | | |
|---|---|---|
| CA | 1290517 | 10/1991 |
| CN | 1824867 A | 8/2006 |

(Continued)

OTHER PUBLICATIONS

PCT International Search Report dated Feb. 4, 2008 for International Application No. PCT/US2007/001082.

(Continued)

*Primary Examiner* — Frances Tischler
(74) *Attorney, Agent, or Firm* — Polly C. Owen

(57) ABSTRACT

A process for recovering a concentrated sulfopolyester dispersion is provided comprising routing an aqueous dispersion comprising a water-dispersible sulfopolyester to a sulfopolyester concentration zone to remove water from the aqueous dispersion to produce the concentrated sulfopolyester dispersion and a recovered water stream; wherein the sulfopolyester concentration zone comprises at least one ultrafiltration membrane.

14 Claims, 5 Drawing Sheets

(56) References Cited

U.S. PATENT DOCUMENTS

| | | |
|---|---|---|
| 3,592,796 A | 7/1971 | Trapasso et al. |
| 3,772,076 A | 11/1973 | Keim |
| 3,779,993 A | 12/1973 | Kibler et al. |
| 3,783,093 A | 1/1974 | Gallacher et al. |
| 3,803,210 A | 4/1974 | Rod et al. |
| 3,833,457 A | 9/1974 | Misumi et al. |
| 3,846,507 A | 11/1974 | Thomm et al. |
| 3,985,502 A | 10/1976 | Boorujy et al. |
| 3,998,740 A | 12/1976 | Bost et al. |
| 4,008,344 A | 2/1977 | Okamoto et al. |
| 4,073,777 A | 2/1978 | O'Neill et al. |
| 4,073,988 A | 2/1978 | Nishida et al. |
| 4,100,324 A | 7/1978 | Anderson et al. |
| 4,104,262 A | 8/1978 | Schade |
| 4,121,966 A | 10/1978 | Amano et al. |
| 4,127,696 A | 11/1978 | Okamoto |
| 4,137,393 A | 1/1979 | Sidebotham et al. |
| 4,145,469 A | 3/1979 | Newkirk et al. |
| 4,226,672 A | 10/1980 | Absolon et al. |
| 4,233,355 A | 11/1980 | Sato et al. |
| 4,234,652 A | 11/1980 | Vanoni et al. |
| 4,239,720 A | 12/1980 | Gerlach et al. |
| 4,240,918 A | 12/1980 | Lagasse et al. |
| 4,243,480 A | 1/1981 | Hernandez et al. |
| 4,288,503 A | 9/1981 | Goldberg |
| 4,297,412 A | 10/1981 | Achard et al. |
| 4,299,654 A | 11/1981 | Tlach et al. |
| 4,302,495 A | 11/1981 | Marra |
| 4,304,901 A | 12/1981 | O'Neill et al. |
| 4,342,801 A | 8/1982 | Gerlach et al. |
| 4,350,006 A | 9/1982 | Okamoto et al. |
| 4,365,041 A | 12/1982 | Okamoto et al. |
| 4,381,335 A | 4/1983 | Okamoto |
| 4,410,579 A | 10/1983 | Johns |
| 4,427,557 A | 1/1984 | Stockburger |
| 4,460,649 A | 7/1984 | Park et al. |
| 4,480,085 A | 10/1984 | Larson |
| 4,496,619 A | 1/1985 | Okamoto |
| 4,517,715 A | 5/1985 | Yoshida et al. |
| 4,552,909 A | 11/1985 | Czerwinski et al. |
| 4,569,343 A | 2/1986 | Kimura et al. |
| 4,618,524 A | 10/1986 | Groitzsch et al. |
| 4,647,497 A | 3/1987 | Weeks |
| 4,652,341 A | 3/1987 | Prior |
| 4,699,845 A | 10/1987 | Oikawa et al. |
| 4,710,432 A | 12/1987 | Nishimura et al. |
| 4,738,785 A | 4/1988 | Langston et al. |
| 4,755,421 A | 7/1988 | Manning et al. |
| 4,795,668 A | 1/1989 | Krueger et al. |
| 4,804,719 A | 2/1989 | Weaver et al. |
| 4,810,775 A | 3/1989 | Bendix et al. |
| 4,863,785 A | 9/1989 | Berman et al. |
| 4,873,273 A | 10/1989 | Allan et al. |
| 4,910,292 A | 3/1990 | Blount |
| 4,921,899 A | 5/1990 | Phan et al. |
| 4,940,744 A | 7/1990 | Tortorici et al. |
| 4,943,477 A | 7/1990 | Kanamura et al. |
| 4,946,932 A | 8/1990 | Jenkins |
| 4,966,808 A | 10/1990 | Kawano |
| 4,973,656 A | 11/1990 | Blount |
| 4,990,593 A | 2/1991 | Blount |
| 4,996,252 A | 2/1991 | Phan et al. |
| 5,006,598 A | 4/1991 | Adams et al. |
| 5,039,339 A | 8/1991 | Phan et al. |
| 5,057,368 A | 10/1991 | Largman et al. |
| 5,069,970 A | 12/1991 | Largman et al. |
| 5,073,436 A | 12/1991 | Antonacci et al. |
| 5,108,820 A | 4/1992 | Kaneko et al. |
| 5,124,194 A | 6/1992 | Kawano |
| 5,158,844 A | 10/1992 | Hagens et al. |
| 5,162,074 A | 11/1992 | Hills |
| 5,162,399 A | 11/1992 | Sharma et al. |
| 5,171,767 A | 12/1992 | Buckley et al. |
| 5,176,952 A | 1/1993 | Joseph et al. |
| 5,218,042 A | 6/1993 | Kuo et al. |
| 5,242,640 A | 9/1993 | Butler et al. |
| 5,254,399 A | 10/1993 | Oku et al. |
| 5,258,220 A | 11/1993 | Joseph |
| 5,262,460 A | 11/1993 | Suzuki et al. |
| 5,274,025 A | 12/1993 | Stockl et al. |
| 5,277,976 A | 1/1994 | Hogle et al. |
| 5,281,306 A | 1/1994 | Kakiuchi et al. |
| 5,286,843 A | 2/1994 | Wood |
| 5,290,626 A | 3/1994 | Nishioi et al. |
| 5,290,631 A | 3/1994 | Fleury et al. |
| 5,290,654 A | 3/1994 | Sacripante et al. |
| 5,292,075 A | 3/1994 | Bartlett |
| 5,292,581 A | 3/1994 | Viazmensky et al. |
| 5,292,855 A | 3/1994 | Krutak et al. |
| 5,296,286 A | 3/1994 | Allen et al. |
| 5,308,697 A | 5/1994 | Muramoto et al. |
| 5,336,552 A | 8/1994 | Strack et al. |
| 5,338,406 A | 8/1994 | Smith |
| 5,342,863 A | 8/1994 | Buckley et al. |
| 5,366,804 A | 11/1994 | Dugan |
| 5,368,928 A | 11/1994 | Okamura et al. |
| 5,369,210 A | 11/1994 | George et al. |
| 5,369,211 A | 11/1994 | George et al. |
| 5,374,357 A | 12/1994 | Comstock et al. |
| 5,375,306 A | 12/1994 | Roussin-Moynier |
| 5,378,757 A | 1/1995 | Blount, Jr. et al. |
| 5,382,400 A | 1/1995 | Pike et al. |
| 5,386,003 A | 1/1995 | Greene et al. |
| 5,389,068 A | 2/1995 | Kreck |
| 5,395,693 A | 3/1995 | Cho et al. |
| 5,405,698 A | 4/1995 | Dugan |
| 5,416,156 A | 5/1995 | Kamen |
| 5,423,432 A | 6/1995 | Krutak et al. |
| 5,431,994 A | 7/1995 | Kozulla |
| 5,446,079 A | 8/1995 | Buchanan et al. |
| 5,449,464 A | 9/1995 | El-Shall |
| 5,456,982 A | 10/1995 | Hansen et al. |
| 5,466,410 A | 11/1995 | Hills |
| 5,466,518 A | 11/1995 | Isaac et al. |
| 5,468,536 A | 11/1995 | Whitcomb et al. |
| 5,472,600 A | 12/1995 | Ellefson et al. |
| 5,482,772 A | 1/1996 | Strack et al. |
| 5,486,418 A | 1/1996 | Ohmory et al. |
| 5,496,627 A | 3/1996 | Bagrodia et al. |
| 5,498,468 A | 3/1996 | Blaney |
| 5,502,091 A | 3/1996 | Dasgupta |
| 5,508,101 A | 4/1996 | Patnode et al. |
| 5,509,913 A | 4/1996 | Yeo |
| 5,525,282 A | 6/1996 | Dugan |
| 5,530,059 A | 6/1996 | Blount, Jr. et al. |
| 5,536,811 A | 7/1996 | Wood |
| 5,543,488 A | 8/1996 | Miller et al. |
| 5,545,464 A | 8/1996 | Stokes |
| 5,545,481 A | 8/1996 | Harrington |
| 5,552,495 A | 9/1996 | Miller et al. |
| 5,559,171 A | 9/1996 | Buchanan et al. |
| 5,559,205 A | 9/1996 | Hansen et al. |
| 5,567,510 A | 10/1996 | Patnode et al. |
| 5,571,620 A | 11/1996 | George et al. |
| 5,575,918 A | 11/1996 | Virnig et al. |
| 5,580,911 A | 12/1996 | Buchanan et al. |
| 5,593,778 A | 1/1997 | Kondo et al. |
| 5,593,807 A | 1/1997 | Sacripante et al. |
| 5,599,858 A | 2/1997 | Buchanan et al. |
| 5,605,746 A | 2/1997 | Groeger et al. |
| 5,607,491 A | 3/1997 | Jackson et al. |
| 5,607,765 A | 3/1997 | Hansen et al. |
| 5,620,785 A | 4/1997 | Watt et al. |
| 5,630,972 A | 5/1997 | Patnode et al. |
| 5,635,071 A | 6/1997 | Al-Samadi |
| 5,637,385 A | 6/1997 | Mizuki et al. |
| 5,643,662 A | 7/1997 | Yeo et al. |
| 5,646,237 A | 7/1997 | George et al. |
| 5,652,048 A | 7/1997 | Haynes et al. |
| 5,654,086 A | 8/1997 | Nishijima et al. |
| 5,658,704 A | 8/1997 | Patel et al. |
| 5,660,965 A | 8/1997 | Mychajlowskij et al. |
| 5,672,415 A | 9/1997 | Sawyer et al. |
| 5,688,582 A | 11/1997 | Nagaoka et al. |

(56) References Cited

U.S. PATENT DOCUMENTS

| | | |
|---|---|---|
| 5,698,331 A | 12/1997 | Matsumura et al. |
| 5,709,940 A | 1/1998 | George et al. |
| 5,736,083 A | 4/1998 | Dugan |
| 5,750,605 A | 5/1998 | Blumenthal et al. |
| 5,753,351 A | 5/1998 | Yoshida et al. |
| 5,759,926 A | 6/1998 | Pike et al. |
| 5,762,758 A | 6/1998 | Hoffman |
| 5,763,065 A | 6/1998 | Patnode et al. |
| 5,779,736 A | 7/1998 | Frederick et al. |
| 5,783,503 A | 7/1998 | Gillespie et al. |
| 5,785,725 A | 7/1998 | Cusick et al. |
| 5,798,078 A | 8/1998 | Myers |
| 5,817,740 A | 10/1998 | Anderson et al. |
| 5,820,982 A | 10/1998 | Salsman |
| 5,837,658 A | 11/1998 | Stork |
| 5,843,311 A | 12/1998 | Richter et al. |
| 5,853,701 A | 12/1998 | George et al. |
| 5,853,944 A | 12/1998 | Foucher et al. |
| 5,871,845 A | 2/1999 | Dahringer et al. |
| 5,883,181 A | 3/1999 | Cicchiello et al. |
| 5,888,916 A | 3/1999 | Tadokoro et al. |
| 5,895,710 A | 4/1999 | Sasse et al. |
| 5,916,678 A | 6/1999 | Jackson et al. |
| 5,916,687 A | 6/1999 | Takanashi et al. |
| 5,916,725 A | 6/1999 | Patel et al. |
| 5,916,935 A | 6/1999 | Wiggins et al. |
| 5,935,880 A | 8/1999 | Wang et al. |
| 5,935,883 A | 8/1999 | Pike |
| 5,935,884 A | 8/1999 | Williams et al. |
| 5,948,710 A | 9/1999 | Pomplun et al. |
| 5,952,251 A | 9/1999 | Jackson et al. |
| 5,954,967 A | 9/1999 | Egraz et al. |
| 5,970,583 A | 10/1999 | Groten et al. |
| 5,976,694 A | 11/1999 | Tsai et al. |
| 5,993,668 A | 11/1999 | Duan |
| 5,993,834 A | 11/1999 | Shah et al. |
| 6,004,673 A | 12/1999 | Nishijima |
| 6,007,910 A | 12/1999 | Miller et al. |
| 6,020,420 A | 2/2000 | George |
| 6,037,055 A | 3/2000 | Aneja et al. |
| 6,057,388 A | 5/2000 | Wiggins et al. |
| 6,080,471 A | 6/2000 | Shigematsu et al. |
| 6,090,731 A | 7/2000 | Pike et al. |
| 6,110,249 A | 8/2000 | Medcalf et al. |
| 6,110,588 A | 8/2000 | Perez et al. |
| 6,110,636 A | 8/2000 | Foucher et al. |
| 6,114,407 A | 9/2000 | Myers |
| 6,120,889 A | 9/2000 | Turner et al. |
| 6,121,170 A | 9/2000 | Tsai et al. |
| 6,162,340 A | 12/2000 | Zakikhani |
| 6,162,890 A | 12/2000 | George et al. |
| 6,168,719 B1 | 1/2001 | Shimokawa et al. |
| 6,171,685 B1 | 1/2001 | George et al. |
| 6,174,602 B1 | 1/2001 | Matsui et al. |
| 6,177,193 B1 | 1/2001 | Tsai et al. |
| 6,177,607 B1 | 1/2001 | Blaney et al. |
| 6,183,648 B1 | 2/2001 | Kozak et al. |
| 6,194,517 B1 | 2/2001 | Pomplun et al. |
| 6,200,669 B1 | 3/2001 | Marmon et al. |
| 6,211,309 B1 | 4/2001 | McIntosh et al. |
| 6,218,321 B1 | 4/2001 | Lorcks et al. |
| 6,225,243 B1 | 5/2001 | Austin |
| 6,235,392 B1 | 5/2001 | Luo et al. |
| 6,248,809 B1 | 6/2001 | Buckley et al. |
| 6,294,645 B1 | 9/2001 | Allen et al. |
| 6,296,933 B1 | 10/2001 | Goda et al. |
| 6,300,306 B1 | 10/2001 | Firkins et al. |
| 6,316,592 B1 | 11/2001 | Bates et al. |
| 6,322,887 B1 | 11/2001 | Matsui et al. |
| 6,331,606 B1 | 12/2001 | Sun |
| 6,332,994 B1 | 12/2001 | Karageorgiou |
| 6,335,092 B1 | 1/2002 | Takeda et al. |
| 6,348,679 B1 | 2/2002 | Ryan et al. |
| 6,352,948 B1 | 3/2002 | Pike et al. |
| 6,355,137 B1 | 3/2002 | Staib |
| 6,361,784 B1 | 3/2002 | Brennan et al. |
| 6,365,697 B1 | 4/2002 | Kim et al. |
| 6,369,136 B2 | 4/2002 | Sorriero et al. |
| 6,381,817 B1 | 5/2002 | Moody, III |
| 6,384,108 B1 | 5/2002 | Breton et al. |
| 6,402,870 B1 | 6/2002 | Groten et al. |
| 6,403,677 B1 | 6/2002 | Walker |
| 6,417,251 B1 | 7/2002 | Brady |
| 6,420,024 B1 | 7/2002 | Perez et al. |
| 6,420,027 B2 | 7/2002 | Kimura et al. |
| 6,428,900 B1 | 8/2002 | Wang |
| 6,429,253 B1 | 8/2002 | Guerro et al. |
| 6,430,348 B1 | 8/2002 | Asano et al. |
| 6,432,532 B2 | 8/2002 | Perez et al. |
| 6,432,850 B1 | 8/2002 | Takagi et al. |
| 6,436,855 B1 | 8/2002 | Iwata et al. |
| 6,440,556 B2 | 8/2002 | Matsui et al. |
| 6,441,267 B1 | 8/2002 | Dugan |
| 6,471,910 B1 | 10/2002 | Haggard |
| 6,488,731 B2 | 12/2002 | Schultheiss et al. |
| 6,506,853 B2 | 1/2003 | Duan |
| 6,509,092 B1 | 1/2003 | Dugan |
| 6,512,024 B1 | 1/2003 | Lundgard et al. |
| 6,533,938 B1 | 3/2003 | Dilorio et al. |
| 6,541,175 B1 | 4/2003 | Jiang et al. |
| 6,548,592 B1 | 4/2003 | Lang et al. |
| 6,550,622 B2 | 4/2003 | Koslow |
| 6,551,353 B1 | 4/2003 | Baker et al. |
| 6,552,123 B1 | 4/2003 | Katayama et al. |
| 6,552,162 B1 | 4/2003 | Wang et al. |
| 6,554,881 B1 | 4/2003 | Healey |
| 6,573,204 B1 | 6/2003 | Philipp et al. |
| 6,576,716 B1 | 6/2003 | Wo |
| 6,579,466 B1 | 6/2003 | David et al. |
| 6,583,075 B1 | 6/2003 | Dugan |
| 6,586,529 B2 | 7/2003 | Mumick et al. |
| 6,589,426 B1 | 7/2003 | Husain et al. |
| 6,602,386 B1 | 8/2003 | Takeuchi et al. |
| 6,602,955 B2 | 8/2003 | Soerens et al. |
| H2086 H | 10/2003 | Amsler |
| 6,638,677 B2 | 10/2003 | Patel et al. |
| 6,657,017 B2 | 12/2003 | Wo et al. |
| 6,664,437 B2 | 12/2003 | Sawyer et al. |
| 6,692,825 B2 | 2/2004 | Qin et al. |
| 6,706,652 B2 | 3/2004 | Groten et al. |
| 6,720,063 B2 | 4/2004 | Kobayashi et al. |
| 6,730,387 B2 | 5/2004 | Rezai et al. |
| 6,743,506 B2 | 6/2004 | Bond et al. |
| 6,746,766 B2 | 6/2004 | Bond et al. |
| 6,746,779 B2 | 6/2004 | Hayes et al. |
| 6,759,124 B2 | 7/2004 | Royer et al. |
| 6,764,802 B2 | 7/2004 | Maric et al. |
| 6,767,498 B1 | 7/2004 | Talley, Jr. et al. |
| 6,776,858 B2 | 8/2004 | Bansal et al. |
| 6,780,560 B2 | 8/2004 | Farrugia et al. |
| 6,780,942 B2 | 8/2004 | Leon et al. |
| 6,787,245 B1 | 9/2004 | Hayes |
| 6,787,425 B1 | 9/2004 | Rotondaro et al. |
| 6,815,382 B1 | 11/2004 | Groten et al. |
| 6,821,672 B2 | 11/2004 | Zguris |
| 6,838,172 B2 | 1/2005 | Yoon et al. |
| 6,838,403 B2 | 1/2005 | Tsai et al. |
| 6,841,038 B2 | 1/2005 | Horenziak et al. |
| 6,844,062 B2 | 1/2005 | Matsui et al. |
| 6,844,063 B2 | 1/2005 | Matsui et al. |
| 6,849,329 B2 | 2/2005 | Perez et al. |
| 6,855,422 B2 | 2/2005 | Magill et al. |
| 6,860,906 B2 | 3/2005 | Malisz et al. |
| 6,861,142 B1 | 3/2005 | Wilkie et al. |
| 6,890,649 B2 | 5/2005 | Hobbs et al. |
| 6,893,711 B2 | 5/2005 | Williamson et al. |
| 6,900,148 B2 | 5/2005 | Yoneda et al. |
| 6,902,796 B2 | 6/2005 | Morell et al. |
| 6,946,506 B2 | 9/2005 | Bond et al. |
| 6,949,288 B2 | 9/2005 | Hodge et al. |
| 6,953,622 B2 | 10/2005 | Tsai et al. |
| 6,989,193 B2 | 1/2006 | Haile et al. |
| 6,989,194 B2 | 1/2006 | Bansal et al. |
| 7,008,485 B2 | 3/2006 | Heikkila et al. |

(56) References Cited

U.S. PATENT DOCUMENTS

| | | |
|---|---|---|
| 7,011,653 B2 | 3/2006 | Imsangjan et al. |
| 7,011,885 B2 | 3/2006 | Chang et al. |
| 7,014,803 B2 | 3/2006 | Perez et al. |
| 7,022,201 B2 | 4/2006 | Anderson et al. |
| 7,025,885 B2 | 4/2006 | Cote et al. |
| 7,026,033 B2 | 4/2006 | Fujimori et al. |
| 7,070,695 B2 | 7/2006 | Husain et al. |
| 7,087,301 B2 | 8/2006 | Musgrave et al. |
| 7,091,140 B1 | 8/2006 | Ferencz et al. |
| 7,097,904 B2 | 8/2006 | Ochi et al. |
| 7,112,389 B1 | 9/2006 | Arora et al. |
| 7,144,614 B2 | 12/2006 | Nakajima et al. |
| 7,160,612 B2 | 1/2007 | Magill et al. |
| 7,163,744 B2 | 1/2007 | Nightingale |
| 7,166,225 B2 | 1/2007 | Pitt et al. |
| 7,179,376 B2 | 2/2007 | Kaleem et al. |
| 7,186,343 B2 | 3/2007 | Rabie et al. |
| 7,186,344 B2 | 3/2007 | Hughes |
| 7,193,029 B2 | 3/2007 | Hayes |
| 7,194,788 B2 | 3/2007 | Clark et al. |
| 7,195,814 B2 | 3/2007 | Ista et al. |
| 7,214,765 B2 | 5/2007 | Ringeisen et al. |
| 7,220,815 B2 | 5/2007 | Hayes |
| 7,238,415 B2 | 7/2007 | Rodriguez et al. |
| 7,238,423 B2 | 7/2007 | Calhoun et al. |
| 7,241,497 B2 | 7/2007 | Magill et al. |
| 7,276,139 B2 | 10/2007 | Katai et al. |
| 7,285,209 B2 | 10/2007 | Yu et al. |
| 7,291,270 B2 | 11/2007 | Gibson et al. |
| 7,291,389 B1 | 11/2007 | Bitler et al. |
| 7,304,125 B2 | 12/2007 | Ibar |
| 7,306,735 B2 | 12/2007 | Baggott et al. |
| 7,309,372 B2 | 12/2007 | Kahlbaugh et al. |
| 7,314,497 B2 | 1/2008 | Kahlbaugh et al. |
| 7,329,723 B2 | 2/2008 | Jernigan et al. |
| 7,338,664 B2 | 3/2008 | Tseng et al. |
| 7,344,775 B2 | 3/2008 | Stevens et al. |
| 7,347,947 B2 | 3/2008 | Nakamura et al. |
| 7,357,985 B2 | 4/2008 | Kurian et al. |
| 7,358,022 B2 | 4/2008 | Farrugia et al. |
| 7,358,323 B2 | 4/2008 | Maeda et al. |
| 7,358,325 B2 | 4/2008 | Hayes |
| 7,361,700 B2 | 4/2008 | Sunamori et al. |
| 7,365,118 B2 | 4/2008 | McCleskey et al. |
| 7,371,701 B2 | 5/2008 | Inagaki |
| 7,387,976 B2 | 6/2008 | Baba et al. |
| 7,388,058 B2 | 6/2008 | Kaku et al. |
| 7,405,171 B2 | 7/2008 | Tsujiyama et al. |
| 7,405,266 B2 | 7/2008 | Bentley et al. |
| 7,407,514 B2 | 8/2008 | Li et al. |
| 7,432,219 B2 | 10/2008 | Strandqvist et al. |
| 7,442,277 B2 | 10/2008 | Kupper et al. |
| 7,462,386 B2 | 12/2008 | Yamasaki et al. |
| 7,497,895 B2 | 3/2009 | Sabottke |
| 7,513,004 B2 | 4/2009 | Luckman et al. |
| 7,544,444 B2 | 6/2009 | Adachi et al. |
| 7,560,159 B2 | 7/2009 | Goda et al. |
| 7,576,019 B2 | 8/2009 | Bond et al. |
| 7,588,688 B2 | 9/2009 | Butters et al. |
| 7,622,188 B2 | 11/2009 | Kamiyama et al. |
| 7,635,745 B2 | 12/2009 | Gupta et al. |
| 7,655,070 B1 | 2/2010 | Dallas et al. |
| 7,660,040 B2 | 2/2010 | Starry et al. |
| 7,666,500 B2 | 2/2010 | Magill et al. |
| 7,666,502 B2 | 2/2010 | Magill et al. |
| 7,666,504 B2 | 2/2010 | Ochi et al. |
| 7,674,510 B2 | 3/2010 | Kamiya |
| 7,687,143 B2 | 3/2010 | Gupta et al. |
| 7,695,812 B2 | 4/2010 | Peng et al. |
| 7,696,111 B2 | 4/2010 | Mangold et al. |
| 7,704,595 B2 | 4/2010 | Morin |
| 7,718,104 B2 | 5/2010 | MacDonald et al. |
| 7,727,627 B2 | 6/2010 | Sen et al. |
| 7,732,357 B2 | 6/2010 | Annis et al. |
| 7,732,557 B2 | 6/2010 | Phelps et al. |
| 7,736,737 B2 | 6/2010 | Van Dun et al. |
| 7,737,060 B2 | 6/2010 | Strickler et al. |
| 7,744,807 B2 | 6/2010 | Berrigan et al. |
| 7,754,123 B2 | 7/2010 | Verdegan et al. |
| 7,757,811 B2 | 7/2010 | Fox et al. |
| 7,765,647 B2 | 8/2010 | Smith et al. |
| 7,772,456 B2 | 8/2010 | Zhang et al. |
| 7,820,568 B2 | 10/2010 | Horiguchi et al. |
| 7,837,814 B2 | 11/2010 | Minami et al. |
| 7,858,732 B2 | 12/2010 | Bruchmann et al. |
| 7,883,604 B2 | 2/2011 | Dyer et al. |
| 7,884,037 B2 | 2/2011 | Sirovatka et al. |
| 7,887,526 B2 | 2/2011 | Van Gompel et al. |
| 7,892,672 B2 | 2/2011 | Nishikawa |
| 7,892,992 B2 | 2/2011 | Kamada et al. |
| 7,892,993 B2 | 2/2011 | Gupta et al. |
| 7,896,940 B2 | 3/2011 | Sundet et al. |
| 7,897,078 B2 | 3/2011 | Petersen et al. |
| 7,897,248 B2 | 3/2011 | Barrera et al. |
| 7,902,094 B2 | 3/2011 | Haile et al. |
| 7,902,096 B2 | 3/2011 | Brandner et al. |
| 7,910,207 B2 | 3/2011 | Kamiyama et al. |
| 7,914,866 B2 | 3/2011 | Shannon et al. |
| 7,918,313 B2 | 4/2011 | Gross et al. |
| 7,919,419 B2 | 4/2011 | Hurley et al. |
| 7,922,959 B2 | 4/2011 | Jones et al. |
| 7,923,143 B2 | 4/2011 | Tanaka et al. |
| 7,928,025 B2 | 4/2011 | Shipley et al. |
| 7,931,457 B2 | 4/2011 | Johnson et al. |
| 7,932,192 B2 | 4/2011 | Fujisawa et al. |
| 7,935,645 B2 | 5/2011 | Pourdeyhimi et al. |
| 7,947,142 B2 | 5/2011 | Fox et al. |
| 7,947,864 B2 | 5/2011 | Damay et al. |
| 7,951,313 B2 | 5/2011 | Matsubayashi et al. |
| 7,951,452 B2 | 5/2011 | Nakayama et al. |
| 7,959,848 B2 | 6/2011 | Reneker et al. |
| 8,021,457 B2 | 9/2011 | Dema et al. |
| 8,057,567 B2 | 11/2011 | Webb et al. |
| 8,129,019 B2 | 3/2012 | Pourdeyhimi et al. |
| 8,148,278 B2 | 4/2012 | Gupta et al. |
| 8,158,244 B2 | 4/2012 | Gupta et al. |
| 8,163,385 B2 | 4/2012 | Gupta et al. |
| 8,178,199 B2 | 5/2012 | Gupta et al. |
| 8,216,953 B2 | 7/2012 | Haile et al. |
| 8,227,362 B2 | 7/2012 | Haile et al. |
| 8,236,713 B2 | 8/2012 | Haile et al. |
| 8,247,335 B2 | 8/2012 | Haile et al. |
| 8,257,628 B2 | 9/2012 | Gupta et al. |
| 8,262,958 B2 | 9/2012 | Haile et al. |
| 8,273,451 B2 | 9/2012 | Gupta et al. |
| 8,277,706 B2 | 10/2012 | Gupta et al. |
| 8,314,041 B2 | 11/2012 | Gupta et al. |
| 8,388,877 B2 | 3/2013 | Gupta et al. |
| 8,398,907 B2 | 3/2013 | Gupta et al. |
| 8,435,908 B2 | 5/2013 | Haile et al. |
| 8,444,895 B2 | 5/2013 | Haile et al. |
| 8,444,896 B2 | 5/2013 | Haile et al. |
| 8,465,565 B2 | 6/2013 | Calis et al. |
| 8,512,519 B2 | 8/2013 | Gupta et al. |
| 8,513,147 B2 | 8/2013 | Gupta et al. |
| 8,557,374 B2 | 10/2013 | Gupta et al. |
| 8,613,363 B2 | 12/2013 | Koslow |
| 8,623,247 B2 | 1/2014 | Haile et al. |
| 8,871,052 B2 | 10/2014 | Parker et al. |
| 8,980,774 B2 | 3/2015 | Zhang et al. |
| 9,273,417 B2 | 3/2016 | Gupta et al. |
| 9,303,357 B2 | 4/2016 | Clark et al. |
| 2002/0009590 A1 | 1/2002 | Matsui et al. |
| 2002/0030016 A1 | 3/2002 | Schmidt |
| 2002/0079121 A1 | 6/2002 | Ryan et al. |
| 2002/0090876 A1 | 7/2002 | Takase et al. |
| 2002/0100728 A1* | 8/2002 | Poncelet ............... C01B 33/26 210/660 |
| 2002/0106510 A1 | 8/2002 | Deguchi et al. |
| 2002/0123290 A1 | 9/2002 | Tsai et al. |
| 2002/0127937 A1 | 9/2002 | Lange et al. |
| 2002/0127939 A1 | 9/2002 | Hwo et al. |
| 2002/0146552 A1 | 10/2002 | Mumick et al. |
| 2002/0187329 A1 | 12/2002 | Ista et al. |

(56) References Cited

U.S. PATENT DOCUMENTS

| | | |
|---|---|---|
| 2003/0024878 A1* | 2/2003 | Baltussen .............. B01F 3/0807 210/634 |
| 2003/0026986 A1 | 2/2003 | Matsui et al. |
| 2003/0057155 A1 | 3/2003 | Husain et al. |
| 2003/0077444 A1 | 4/2003 | Bond et al. |
| 2003/0091822 A1 | 5/2003 | Bond et al. |
| 2003/0092343 A1 | 5/2003 | Bond et al. |
| 2003/0104204 A1 | 6/2003 | Bond et al. |
| 2003/0111763 A1 | 6/2003 | Jen |
| 2003/0166370 A1 | 9/2003 | Harris et al. |
| 2003/0166371 A1 | 9/2003 | Fingal et al. |
| 2003/0168191 A1 | 9/2003 | Hansen et al. |
| 2003/0176132 A1 | 9/2003 | Moriyasu et al. |
| 2003/0194558 A1 | 10/2003 | Anderson |
| 2003/0196955 A1 | 10/2003 | Hughes |
| 2004/0054331 A1 | 3/2004 | Hamilton et al. |
| 2004/0081829 A1 | 4/2004 | Klier et al. |
| 2004/0157037 A1 | 8/2004 | Yamaguchi et al. |
| 2004/0194558 A1 | 10/2004 | Nagase |
| 2004/0209058 A1 | 10/2004 | Chou et al. |
| 2004/0211729 A1 | 10/2004 | Sunkara et al. |
| 2004/0214495 A1 | 10/2004 | Foss et al. |
| 2004/0242106 A1 | 12/2004 | Rabasco et al. |
| 2004/0242838 A1 | 12/2004 | Duan |
| 2004/0258910 A1 | 12/2004 | Haile et al. |
| 2004/0260034 A1 | 12/2004 | Haile et al. |
| 2005/0026527 A1 | 2/2005 | Schmidt et al. |
| 2005/0027098 A1 | 2/2005 | Hayes |
| 2005/0032450 A1 | 2/2005 | Haggard et al. |
| 2005/0079781 A1 | 4/2005 | Tsujimoto et al. |
| 2005/0115902 A1 | 6/2005 | Kaleem et al. |
| 2005/0125908 A1 | 6/2005 | Pourdeyhimi |
| 2005/0148261 A1 | 7/2005 | Close et al. |
| 2005/0171250 A1 | 8/2005 | Hayes |
| 2005/0208300 A1 | 9/2005 | Magill et al. |
| 2005/0215157 A1 | 9/2005 | Dugan et al. |
| 2005/0221709 A1 | 10/2005 | Jordan et al. |
| 2005/0222956 A1 | 10/2005 | Bristow et al. |
| 2005/0227068 A1 | 10/2005 | Dugan |
| 2005/0239359 A1 | 10/2005 | Jones et al. |
| 2005/0282008 A1 | 12/2005 | Haile et al. |
| 2005/0287895 A1 | 12/2005 | Bansal |
| 2006/0011544 A1 | 1/2006 | Sharma et al. |
| 2006/0019570 A1 | 1/2006 | Groten et al. |
| 2006/0021938 A1 | 2/2006 | Diallo |
| 2006/0030230 A1 | 2/2006 | Nagaoka et al. |
| 2006/0035556 A1 | 2/2006 | Yokoi et al. |
| 2006/0049386 A1 | 3/2006 | Kody et al. |
| 2006/0051575 A1 | 3/2006 | Yoon et al. |
| 2006/0057350 A1 | 3/2006 | Ochi et al. |
| 2006/0057373 A1 | 3/2006 | Inagaki et al. |
| 2006/0060529 A1 | 3/2006 | Cote et al. |
| 2006/0065600 A1 | 3/2006 | Sunkara et al. |
| 2006/0081330 A1 | 4/2006 | Minami et al. |
| 2006/0083917 A1 | 4/2006 | Dugan |
| 2006/0093814 A1 | 5/2006 | Chang |
| 2006/0093819 A1 | 5/2006 | Atwood et al. |
| 2006/0113033 A1 | 6/2006 | Bruner |
| 2006/0128247 A1 | 6/2006 | Skoog et al. |
| 2006/0135020 A1 | 6/2006 | Weinberg et al. |
| 2006/0147709 A1 | 7/2006 | Mizumura et al. |
| 2006/0155094 A1 | 7/2006 | Meckel et al. |
| 2006/0159918 A1 | 7/2006 | Dugan et al. |
| 2006/0177656 A1 | 8/2006 | Kolmes et al. |
| 2006/0189956 A1 | 8/2006 | Catalan |
| 2006/0194027 A1 | 8/2006 | Pourdeyhimi et al. |
| 2006/0194047 A1 | 8/2006 | Gupta et al. |
| 2006/0204753 A1 | 9/2006 | Simmonds et al. |
| 2006/0210797 A1 | 9/2006 | Masuda et al. |
| 2006/0230731 A1 | 10/2006 | Kalayci et al. |
| 2006/0234049 A1 | 10/2006 | Van Dun et al. |
| 2006/0234050 A1 | 10/2006 | Frankel |
| 2006/0234587 A1 | 10/2006 | Horiguchi et al. |
| 2006/0263601 A1 | 11/2006 | Wang et al. |
| 2006/0281383 A1 | 12/2006 | Schmitt et al. |
| 2007/0009736 A1 | 1/2007 | Chuang et al. |
| 2007/0020453 A1 | 1/2007 | Sen et al. |
| 2007/0021021 A1 | 1/2007 | Verdegan et al. |
| 2007/0031637 A1 | 2/2007 | Anderson |
| 2007/0031668 A1 | 2/2007 | Hietpas et al. |
| 2007/0039889 A1 | 2/2007 | Ashford |
| 2007/0048523 A1 | 3/2007 | Pollet et al. |
| 2007/0056906 A1 | 3/2007 | Kaleem et al. |
| 2007/0062872 A1* | 3/2007 | Parker ................... B01D 61/18 210/650 |
| 2007/0074628 A1 | 4/2007 | Jones et al. |
| 2007/0077427 A1 | 4/2007 | Dugan |
| 2007/0098982 A1 | 5/2007 | Nishida et al. |
| 2007/0102361 A1 | 5/2007 | Kiefer et al. |
| 2007/0110980 A1 | 5/2007 | Shah |
| 2007/0110998 A1 | 5/2007 | Steele et al. |
| 2007/0114177 A1 | 5/2007 | Sabottke |
| 2007/0122613 A1 | 5/2007 | Stevens et al. |
| 2007/0122614 A1 | 5/2007 | Peng et al. |
| 2007/0128404 A1 | 6/2007 | Tung et al. |
| 2007/0167096 A1 | 7/2007 | Scott |
| 2007/0179275 A1* | 8/2007 | Gupta ..................... C08J 11/06 528/480 |
| 2007/0182040 A1 | 8/2007 | Suzuki et al. |
| 2007/0190319 A1 | 8/2007 | Kalayci |
| 2007/0232179 A1 | 10/2007 | Polat et al. |
| 2007/0232180 A1 | 10/2007 | Polat et al. |
| 2007/0243377 A1 | 10/2007 | Nishida et al. |
| 2007/0254153 A1 | 11/2007 | Nadkarni et al. |
| 2007/0258935 A1 | 11/2007 | McEntire et al. |
| 2007/0259029 A1 | 11/2007 | McEntire et al. |
| 2007/0259177 A1 | 11/2007 | Gupta et al. |
| 2007/0264520 A1 | 11/2007 | Wood et al. |
| 2007/0278151 A1 | 12/2007 | Musale |
| 2007/0278152 A1 | 12/2007 | Musale |
| 2008/0000836 A1 | 1/2008 | Wang et al. |
| 2008/0003400 A1 | 1/2008 | Tseng |
| 2008/0003905 A1 | 1/2008 | Tseng et al. |
| 2008/0003912 A1 | 1/2008 | Pourdeyhimi et al. |
| 2008/0009574 A1 | 1/2008 | Huenefeld et al. |
| 2008/0009650 A1 | 1/2008 | Sluijmers et al. |
| 2008/0011680 A1 | 1/2008 | Partridge et al. |
| 2008/0038974 A1 | 2/2008 | Eagles |
| 2008/0039540 A1 | 2/2008 | Reitz |
| 2008/0064285 A1 | 3/2008 | Morton et al. |
| 2008/0134652 A1 | 6/2008 | Lim et al. |
| 2008/0152282 A1 | 6/2008 | Ouderkirk et al. |
| 2008/0160278 A1 | 7/2008 | Cheng et al. |
| 2008/0160856 A1 | 7/2008 | Chen et al. |
| 2008/0160859 A1 | 7/2008 | Gupta et al. |
| 2008/0170982 A1 | 7/2008 | Zhang et al. |
| 2008/0188151 A1 | 8/2008 | Yokoi et al. |
| 2008/0207833 A1 | 8/2008 | Bear et al. |
| 2008/0229672 A1 | 9/2008 | Woo et al. |
| 2008/0233850 A1 | 9/2008 | Woo et al. |
| 2008/0245037 A1 | 10/2008 | Rogers et al. |
| 2008/0264586 A1 | 10/2008 | Likitalo et al. |
| 2008/0287026 A1 | 11/2008 | Chakravarty et al. |
| 2008/0305389 A1 | 12/2008 | Arora et al. |
| 2008/0311815 A1 | 12/2008 | Gupta et al. |
| 2009/0025895 A1 | 1/2009 | Cowman |
| 2009/0036015 A1 | 2/2009 | Nhan et al. |
| 2009/0042475 A1 | 2/2009 | Pourdeyhimi et al. |
| 2009/0163449 A1 | 6/2009 | Wempe |
| 2009/0249956 A1 | 10/2009 | Chi et al. |
| 2009/0258182 A1 | 10/2009 | Okamoto et al. |
| 2009/0274862 A1 | 11/2009 | Nakayama et al. |
| 2009/0294435 A1 | 12/2009 | Nhan et al. |
| 2009/0305592 A1 | 12/2009 | Shi et al. |
| 2010/0018660 A1 | 1/2010 | Varnell |
| 2010/0035500 A1 | 2/2010 | Kimura et al. |
| 2010/0044289 A1 | 2/2010 | Koslow |
| 2010/0072126 A1 | 3/2010 | Tsujimoto et al. |
| 2010/0112325 A1 | 5/2010 | Iwamoto et al. |
| 2010/0133173 A1 | 6/2010 | Inagaki |
| 2010/0133197 A1 | 6/2010 | Langner |
| 2010/0136312 A1 | 6/2010 | Inagaki |
| 2010/0143717 A1 | 6/2010 | Sakamoto et al. |
| 2010/0143731 A1 | 6/2010 | DeZurik et al. |

(56) References Cited

U.S. PATENT DOCUMENTS

| | | |
|---|---|---|
| 2010/0173154 A1 | 7/2010 | Shimotsu et al. |
| 2010/0180558 A1 | 7/2010 | Ito et al. |
| 2010/0187712 A1 | 7/2010 | Gupta et al. |
| 2010/0197027 A1 | 8/2010 | Zhang et al. |
| 2010/0200512 A1 | 8/2010 | Chase et al. |
| 2010/0203788 A1 | 8/2010 | Kimura et al. |
| 2010/0247894 A1 | 9/2010 | Beard |
| 2010/0272938 A1 | 10/2010 | Mitchell et al. |
| 2010/0273947 A1 | 10/2010 | Miyauchi et al. |
| 2010/0282682 A1 | 11/2010 | Eaton et al. |
| 2010/0285101 A1 | 11/2010 | Moore et al. |
| 2010/0291213 A1 | 11/2010 | Berrigan et al. |
| 2010/0310921 A1 | 12/2010 | Hayakawa et al. |
| 2011/0020590 A1 | 1/2011 | Yoneda et al. |
| 2011/0030885 A1 | 2/2011 | Anneaux et al. |
| 2011/0033705 A1 | 2/2011 | Komura et al. |
| 2011/0036487 A1 | 2/2011 | Rajala et al. |
| 2011/0039055 A1 | 2/2011 | Fujisawa et al. |
| 2011/0039468 A1 | 2/2011 | Baldwin, Jr. et al. |
| 2011/0040277 A1 | 2/2011 | Rajala et al. |
| 2011/0041471 A1 | 2/2011 | Sebastian et al. |
| 2011/0045042 A1 | 2/2011 | Sasaki et al. |
| 2011/0045231 A1 | 2/2011 | Kajiwara et al. |
| 2011/0045261 A1 | 2/2011 | Sellars |
| 2011/0046461 A1 | 2/2011 | McKenna |
| 2011/0049769 A1 | 3/2011 | Duchoslav et al. |
| 2011/0054429 A1 | 3/2011 | Lademann et al. |
| 2011/0056638 A1 | 3/2011 | Rosset |
| 2011/0059669 A1 | 3/2011 | He et al. |
| 2011/0064928 A1 | 3/2011 | Bonneh |
| 2011/0065573 A1 | 3/2011 | McEneany et al. |
| 2011/0065871 A1 | 3/2011 | Nagano et al. |
| 2011/0067369 A1 | 3/2011 | Chung et al. |
| 2011/0068507 A1 | 3/2011 | Warren et al. |
| 2011/0074060 A1 | 3/2011 | Angadjivand et al. |
| 2011/0076250 A1 | 3/2011 | Belenkaya et al. |
| 2011/0084028 A1 | 4/2011 | Stanfel et al. |
| 2011/0091761 A1 | 4/2011 | Miller et al. |
| 2011/0094515 A1 | 4/2011 | Duffy |
| 2011/0104493 A1 | 5/2011 | Barnholtz et al. |
| 2011/0114274 A1 | 5/2011 | Takano et al. |
| 2011/0117176 A1 | 5/2011 | Klun et al. |
| 2011/0117353 A1 | 5/2011 | Henshaw et al. |
| 2011/0117439 A1 | 5/2011 | Yamada et al. |
| 2011/0123584 A1 | 5/2011 | Seidling et al. |
| 2011/0124769 A1 | 5/2011 | Moen et al. |
| 2011/0124835 A1 | 5/2011 | DeWeijer et al. |
| 2011/0129510 A1 | 6/2011 | Liebmann et al. |
| 2011/0130063 A1 | 6/2011 | Matsubayashi et al. |
| 2011/0139386 A1 | 6/2011 | Gupta et al. |
| 2011/0142900 A1 | 6/2011 | Ohta et al. |
| 2011/0143110 A1 | 6/2011 | Tsuchiya et al. |
| 2011/0147299 A1 | 6/2011 | Stanfel et al. |
| 2011/0168625 A1 | 7/2011 | Gupta et al. |
| 2011/0171535 A1 | 7/2011 | Ohinshi et al. |
| 2011/0171890 A1 | 7/2011 | Nakayama et al. |
| 2012/0015577 A1 | 1/2012 | Rudman et al. |
| 2012/0175074 A1 | 7/2012 | Gupta et al. |
| 2012/0175298 A1 | 7/2012 | Gupta et al. |
| 2012/0177996 A1 | 7/2012 | Gupta et al. |
| 2012/0178331 A1 | 7/2012 | Gupta et al. |
| 2012/0180968 A1 | 7/2012 | Gupta et al. |
| 2012/0181720 A1 | 7/2012 | Gupta et al. |
| 2012/0183861 A1 | 7/2012 | Gupta et al. |
| 2012/0183862 A1 | 7/2012 | Gupta et al. |
| 2012/0184164 A1 | 7/2012 | Gupta et al. |
| 2012/0219756 A1 | 8/2012 | Yoshida et al. |
| 2012/0219766 A1 | 8/2012 | Gupta et al. |
| 2012/0251597 A1 | 10/2012 | Gupta et al. |
| 2012/0302119 A1 | 11/2012 | Clark et al. |
| 2012/0302120 A1 | 11/2012 | Clark et al. |
| 2013/0193086 A1 | 8/2013 | Parker et al. |
| 2013/0337712 A1 | 12/2013 | Zhang et al. |
| 2014/0273704 A1 | 9/2014 | Baer et al. |
| 2014/0311694 A1 | 10/2014 | Clark et al. |
| 2014/0311695 A1 | 10/2014 | Clark et al. |

FOREIGN PATENT DOCUMENTS

| | | |
|---|---|---|
| EP | 0028909 A1 | 11/1980 |
| EP | 0193798 A1 | 9/1986 |
| EP | 0235820 A1 | 9/1987 |
| EP | 0 340 763 A1 | 11/1989 |
| EP | 0 396 771 A1 | 11/1990 |
| EP | 0 610 897 A1 | 8/1994 |
| EP | 0610894 A | 8/1994 |
| EP | 0 618 317 A1 | 10/1994 |
| EP | 0 830 466 A1 | 3/1998 |
| EP | 0 836 656 A1 | 4/1998 |
| EP | 0 859 073 A1 | 8/1998 |
| EP | 0 880 909 A1 | 12/1998 |
| EP | 0 666 344 B1 | 9/1999 |
| EP | 1 161 576 A1 | 12/2001 |
| EP | 1 243 675 A1 | 9/2002 |
| EP | 0 645 480 B1 | 11/2002 |
| EP | 0 961 847 B1 | 12/2002 |
| EP | 1359632 A2 | 4/2003 |
| EP | 0 935 682 B1 | 9/2003 |
| EP | 1 416 077 A2 | 5/2004 |
| EP | 1457591 A1 | 9/2004 |
| EP | 0 905 292 B1 | 10/2004 |
| EP | 1538686 A1 | 6/2005 |
| EP | 1 550 746 A1 | 7/2005 |
| EP | 1 322 802 B1 | 8/2005 |
| EP | 1 314 808 B1 | 1/2006 |
| EP | 1252219 B1 | 8/2006 |
| EP | 1 325 184 B1 | 9/2006 |
| EP | 1 715 089 A2 | 10/2006 |
| EP | 1 319 095 B1 | 11/2006 |
| EP | 1 731 634 | 12/2006 |
| EP | 1 149 195 B1 | 1/2007 |
| EP | 1 412 567 B1 | 1/2007 |
| EP | 1 404 905 B1 | 4/2007 |
| EP | 0 842 310 B1 | 1/2008 |
| EP | 1 894 609 A1 | 3/2008 |
| EP | 1 903 134 A1 | 3/2008 |
| EP | 1 938 883 A1 | 7/2008 |
| EP | 2 082 082 A2 | 7/2009 |
| EP | 1 516 079 B1 | 12/2009 |
| EP | 2 135 984 A1 | 12/2009 |
| EP | 1 224 900 B1 | 6/2010 |
| EP | 2 243 872 A1 | 10/2010 |
| EP | 2283796 A1 | 2/2011 |
| EP | 2287374 A1 | 2/2011 |
| EP | 1 620 506 B1 | 3/2011 |
| EP | 0847263 B2 | 3/2011 |
| EP | 2292309 A1 | 3/2011 |
| EP | 1474555 B1 | 4/2011 |
| EP | 2308579 A1 | 4/2011 |
| EP | 2311542 A1 | 4/2011 |
| EP | 2311543 A1 | 4/2011 |
| FR | 2 654 674 A1 | 5/1991 |
| FR | 2867193 A1 | 9/2005 |
| GB | 1073640 | 6/1967 |
| JP | 52-066719 | 6/1977 |
| JP | 58-83046 A | 5/1983 |
| JP | 58174625 A | 10/1983 |
| JP | 58-220818 | 12/1983 |
| JP | 61-047822 | 3/1986 |
| JP | 61-296120 A | 12/1986 |
| JP | 62-078213 | 4/1987 |
| JP | 63-159523 A | 7/1988 |
| JP | 63-227898 A | 9/1988 |
| JP | 01-162825 | 6/1989 |
| JP | 1-229899 A | 9/1989 |
| JP | 1-272820 A | 10/1989 |
| JP | 1-289838 A | 11/1989 |
| JP | 02-026920 A | 1/1990 |
| JP | 02-210092 A | 8/1990 |
| JP | 2-210092 A | 8/1990 |
| JP | 3-16378 B2 | 3/1991 |
| JP | H0390675 A | 4/1991 |

(56) References Cited

FOREIGN PATENT DOCUMENTS

| | | |
|---|---|---|
| JP | 3-180587 A | 8/1991 |
| JP | 04-057918 A | 2/1992 |
| JP | 4327209 A | 11/1992 |
| JP | 5-18334 B2 | 3/1993 |
| JP | H05214649 A | 8/1993 |
| JP | 05-263316 | 10/1993 |
| JP | 1993-263316 A | 10/1993 |
| JP | 5321106 A | 12/1993 |
| JP | 6-002221 A | 1/1994 |
| JP | 6-25396 A | 2/1994 |
| JP | 9-77963 A | 3/1997 |
| JP | 9-100397 A | 4/1997 |
| JP | 9-249742 A | 9/1997 |
| JP | 09-291472 | 11/1997 |
| JP | 09-310230 | 12/1997 |
| JP | 2000-95850 | 4/2000 |
| JP | 3131100 B2 | 1/2001 |
| JP | 2001-123335 | 5/2001 |
| JP | 2002-151040 A | 5/2002 |
| JP | 2003-020524 A | 1/2003 |
| JP | 2003-253555 A | 9/2003 |
| JP | 2004-137319 | 5/2004 |
| JP | 2004-137418 A | 5/2004 |
| JP | 2005-002510 | 1/2005 |
| JP | 2005-154450 A | 6/2005 |
| JP | 2005-330612 A | 12/2005 |
| JP | 2006-233365 A | 9/2006 |
| JP | 2007-092235 | 12/2007 |
| JP | 2008-127694 A | 6/2008 |
| JP | 2010-070870 A | 4/2010 |
| JP | 2010-255173 A | 11/2010 |
| JP | 4648815 B2 | 3/2011 |
| KR | 2001-0044145 | 6/2001 |
| KR | 531939 B1 | 11/2005 |
| KR | 2011-031744 A | 3/2011 |
| KR | 2011-031746 A | 3/2011 |
| RU | 2414950 C1 | 3/2011 |
| RU | 2414960 C1 | 3/2011 |
| TW | 230212 B | 4/2005 |
| WO | WO 93/07197 A1 | 4/1993 |
| WO | WO 9414885 A1 | 7/1994 |
| WO | WO 94/24218 A | 10/1994 |
| WO | WO 95/03172 A1 | 2/1995 |
| WO | WO 99/47621 A1 | 9/1999 |
| WO | WO 99/48668 | 9/1999 |
| WO | WO 01/66666 A2 | 9/2001 |
| WO | WO 02/060497 A2 | 8/2002 |
| WO | WO 03/069038 A1 | 8/2003 |
| WO | WO 2004/067818 A2 | 8/2004 |
| WO | WO 2004/099314 A1 | 11/2004 |
| WO | WO 2004/113598 A2 | 12/2004 |
| WO | WO 2005/066403 A1 | 7/2005 |
| WO | WO 2005/103354 A1 | 11/2005 |
| WO | WO 2005/103357 A1 | 11/2005 |
| WO | WO 2006/001739 A1 | 1/2006 |
| WO | WO 2006/034070 A1 | 3/2006 |
| WO | WO 2006/052732 A2 | 5/2006 |
| WO | WO 2006/098851 A2 | 9/2006 |
| WO | WO 2006/107695 A2 | 10/2006 |
| WO | WO 2007/089423 A2 | 8/2007 |
| WO | WO 2007/112443 A2 | 10/2007 |
| WO | WO 2008/028134 A1 | 3/2008 |
| WO | WO 2008/085332 A2 | 7/2008 |
| WO | WO 2009/024836 A1 | 2/2009 |
| WO | WO 2009/051283 A1 | 4/2009 |
| WO | WO 2009/076401 A1 | 6/2009 |
| WO | WO 2009/088564 A1 | 7/2009 |
| WO | WO 2009/140381 A1 | 11/2009 |
| WO | WO 2009/152349 A1 | 12/2009 |
| WO | WO 2010/114820 A2 | 10/2010 |
| WO | WO 2010/117612 A2 | 10/2010 |
| WO | WO 2010/125239 A2 | 11/2010 |
| WO | WO 2010/140853 A2 | 12/2010 |
| WO | WO 2010/146240 A2 | 12/2010 |
| WO | WO 2011/015709 A1 | 2/2011 |
| WO | WO 2011/018459 A1 | 2/2011 |
| WO | WO 2011/008481 A3 | 3/2011 |
| WO | WO 2011/027732 A1 | 3/2011 |
| WO | WO 2011/028661 A2 | 3/2011 |
| WO | WO 2011/034523 A1 | 3/2011 |
| WO | WO 2011/047966 A1 | 4/2011 |
| WO | WO 2011/049831 A2 | 4/2011 |
| WO | WO 2011/049927 A2 | 4/2011 |
| WO | WO 2011/052173 A1 | 5/2011 |
| WO | WO 2011/054932 A1 | 5/2011 |
| WO | WO 2011/062761 A1 | 5/2011 |
| WO | WO 2011/063372 A2 | 5/2011 |
| WO | WO 2011/066224 A2 | 6/2011 |
| WO | WO 2011/070233 A1 | 6/2011 |
| WO | WO 2011/104427 A1 | 9/2011 |
| WO | WO 2011/157892 A1 | 12/2011 |
| WO | WO 2012/054669 A1 | 4/2012 |
| WO | WO 2012/138552 A2 | 10/2012 |
| WO | WO 2013/116067 A2 | 8/2013 |
| WO | WO 2014/172192 A1 | 10/2014 |

OTHER PUBLICATIONS

U.S. Appl. No. 08/550,042, filed Oct. 30, 1995, Michael C. Cook.
PCT International Search Report dated Nov. 6, 2008 for International Application No. PCT/US2007/025661.
PCT International Search Report dated Jul. 26, 2007 for International Application No. PCT/US2007/001083.
Office Action with Mail Date of Mar. 30, 2009 for related U.S. Appl. No. 11/204,868.
Office Action with Mail Date of Mar. 26, 2009 for related U.S. Appl. No. 11/344,320.
U.S. Appl. No. 61/172,257, filed Apr. 24, 2009, Rakesh Kumar Gupta, et al.
PCT International Search Report dated Jul. 3, 2009 for International Application No. PCT/US2009/001717.
PCT International Search Report dated Feb. 28, 2012 for International Application No. PCT/US2011/056990.
PCT International Search Report dated Feb. 28, 2012 for International Application No. PCT/US2011/056994.
PCT International Search Report dated Feb. 14, 2012 for International Application No. PCT/US2011/056989.
PCT International Search Report dated Feb. 28, 2012 for International Application No. PCT/US2011/056995.
PCT International Search Report dated Feb. 28, 2012 for International Application No. PCT/US2011/056991.
PCT International Search Report dated Feb. 28, 2012 for International Application No. PCT/US2011/057002.
USPTO Notice of Allowance dated Nov. 9, 2009 for copending U.S. Appl. No. 11/648,955.
USPTO Office Action dated Dec. 24, 2009 for copending U.S. Appl. No. 11/344,320.
USPTO Office Action dated Dec. 22, 2009 for copending U.S. Appl. No. 11/204,868.
USPTO Notice of Allowance dated Jun. 9, 2010 for copending U.S. Appl. No. 11/344,320.
USPTO Notice of Allowance dated Jun. 9, 2010 for copending U.S. Appl. No. 11/204,868.
USPTO Office Action dated Aug. 6, 2010 for copending U.S. Appl. No. 11/648,953.
USPTO Office Action dated Dec. 21, 2004 for U.S. Appl. No. 10/850,548, published as 2004-0258910.
USPTO Notice of Allowance dated Jun. 8, 2005 for U.S. Appl. No. 10/850,548.
DIN STD 54900 (in German, no English translation available).
ASTM D6340-98 (Reapproved 2007) ASTM International, copyright Sep. 15, 2010.
PCT International Search Report dated Feb. 7, 2005 for International Application No. PCT/US2004/018682.
Copending U.S. Appl. No. 12/765,461, filed Apr. 22, 2010, Rakesh Kumar Gupta, et al.
Smook, G.A., "Handbook for Pulp and Paper Technologist", Angus Wilde Publications, 2nd Ed., 1992, pp. 194-195, 211-212.

(56) References Cited

OTHER PUBLICATIONS

PCT International Search Report dated Dec. 30, 2008 for International Application No. PCT/US2007/025770.
Ke Qinfei, et al., "Non-woven Science", Donghau University Press, 2004.9, Catalog, p. 115-132 (unavailable).
USPTO Notice of Allowance dated Nov. 9, 2009 for U.S. Appl. No. 11/648,955.
USPTO Office Action dated Sep. 27, 2010 for U.S. Appl. No. 12/199,304.
USPTO Notice of Allowance dated Sep. 30, 2010 for U.S. Appl. No. 11/344,320.
USPTO Notice of Allowance dated Oct. 14, 2010 for U.S. Appl. No. 11/204,868.
Copending U.S. Appl. No. 12/909,574, filed Oct. 21, 2010, Rakesh Kumar Gupta, et al.
Copending U.S. Appl. No. 12/966,483, filed Dec. 13, 2010, William Alston Haile, et al.
Copending U.S. Appl. No. 12/966,487, filed Dec. 13, 2010, William Alston Haile, et al.
Copending U.S. Appl. No. 12/966,494, filed Dec. 13, 2010, William Alston Haile, et al.
Copending U.S. Appl. No. 12/966,502, filed Dec. 13, 2010, William Alston Haile, et al.
Copending U.S. Appl. No. 12/966,507, filed Dec. 13, 2010, William Alston Haile, et al.
Copending U.S. Appl. No. 12/966,512, filed Dec. 13, 2010, William Alston Haile, et al.
Copending U.S. Appl. No. 12/966,518, filed Dec. 13, 2010, William Alston Haile, et al.
Copending U.S. Appl. No. 12/966,521, filed Dec. 13, 2010, William Alston Haile, et al.
Copending U.S. Appl. No. 12/975,443, filed Dec. 22, 2010, Rakesh Kumar Gupta, et al.
Copending U.S. Appl. No. 12/975,447, filed Dec. 22, 2010, Rakesh Kumar Gupta, et al.
Copending U.S. Appl. No. 12/975,450, filed Dec. 22, 2010, Rakesh Kumar Gupta, et al.
Copending U.S. Appl. No. 12/975,452, filed Dec. 22, 2010, Rakesh Kumar Gupta, et al.
Copending U.S. Appl. No. 12/975,456, filed Dec. 22, 2010, Rakesh Kumar Gupta, et al.
Copending U.S. Appl. No. 12/975,459, filed Dec. 22, 2010, Rakesh Kumar Gupta, et al.
Copending U.S. Appl. No. 12/975,463, filed Dec. 22, 2010, Rakesh Kumar Gupta, et al.
Copending U.S. Appl. No. 12/975,482, filed Dec. 22, 2010, Rakesh Kumar Gupta, et al.
Copending U.S. Appl. No. 12/975,484, filed Dec. 22, 2010, Rakesh Kumar Gupta, et al.
Copending U.S. Appl. No. 12/975,487, filed Dec. 22, 2010, Rakesh Kumar Gupta, et al.
Copending U.S. Appl. No. 12/981,950, filed Dec. 30, 2010, William Alston Haile, et al.
Copending U.S. Appl. No. 12/981,960, filed Dec. 30, 2010, William Alston Haile, et al.
Copending U.S. Appl. No. 12/981,982, filed Dec. 30, 2010, William Alston Haile, et al.
Copending U.S. Appl. No. 12/982,001, filed Dec. 30, 2010, William Alston Haile, et al.
New copending U.S. Appl. No. 13/352,362, filed Jan. 18, 2012, Rakesh Kumar Gupta et al.
USPTO Notice of Allowance dated Apr. 4, 2011 for copending U.S. Appl. No. 12/199,304.
USPTO Office Action dated Mar. 18, 2011 for copending U.S. Appl. No. 11/648,953.
USPTO Office Action dated Apr. 6, 2011 for copending U.S. Appl. No. 12/975,487.
USPTO Office Action dated Apr. 4, 2011 for copending U.S. Appl. No. 12/981,960.
USPTO Office Action dated Apr. 6, 2011 for copending U.S. Appl. No. 12/975,482.
USPTO Office Action dated Jun. 7, 2011 for copending U.S. Appl. No. 12/982,001.
USPTO Office Action dated Jun. 9, 2011 for copending U.S. Appl. No. 12/975,459.
USPTO Office Action dated May 27, 2011 for copending U.S. Appl. No. 12/975,452.
USPTO Office Action dated Jun. 23, 2011 for copending U.S. Appl. No. 12/966,487.
USPTO Office Action dated Jun. 23, 2011 for copending U.S. Appl. No. 12/966,502.
USPTO Office Action dated May 10, 2012 for copending U.S. Appl. No. 12/966,521.
USPTO Office Action dated Mar. 16, 2012 for copending U.S. Appl. No. 12/966,483.
USPTO Notice of Allowance dated Apr. 2, 2012 for copending U.S. Appl. No. 12/966,502.
USPTO Office Action dated Jun 23, 2011 for copending U.S. Appl. No. 12/975,443.
USPTO Notice of Allowance dated Jul. 18, 2011 for copending U.S. Appl. No. 12/199,304.
USPTO Office Action dated Aug. 10, 2011 for copending U.S. Appl. No. 12/966,512.
USPTO Office Action dated Sep. 15, 2011 for copending U.S. Appl. No. 11/648,953.
USPTO Office Action dated May 3, 2012 for copending U.S. Appl. No. 12/765,461.
USPTO Office Action dated Sep. 8, 2011 for copending U.S. Appl. No. 12/966,494.
USPTO Notice of Allowance dated Apr. 18, 2012 for copending U.S. Appl. No. 12/966,494.
USPTO Office Action dated Sep. 26, 2011 for copending U.S. Appl. No. 12/966,507.
USPTO Office Action dated Apr. 23, 2012 for copending U.S. Appl. No. 12/966,507.
USPTO Office Action dated Sep. 1, 2011 for copending U.S. Appl. No. 12/975,450.
USPTO Office Action dated Aug. 24, 2011 for copending U.S. Appl. No. 12/975,456.
USPTO Office Action dated Apr. 19, 2012 for copending U.S. Appl. No. 12/975,456.
USPTO Office Action dated Sep. 27, 2011 for copending U.S. Appl. No. 12/975,463.
USPTO Office Action dated Apr. 19, 2012 for copending U.S. Appl. No. 12/975,463.
USPTO Office Action dated Aug. 31, 2011 for copending U.S. Appl. No. 13/053,615.
Coons, R., "Eastman Chemical Core Focus Delivers Value," Chemical Week, Aug. 15/22, 2011, pp. 19-22.
USPTO Office Action dated Nov. 10, 2011 for copending U.S. Appl. No. 12/981,950.
USPTO Office Action dated Jan. 25, 2012 for copending U.S. Appl. No. 12/981,982.
USPTO Notice of Allowance dated Jan. 3, 2012 for copending U.S. Appl. No. 12/975,487.
USPTO Notice of Allowance dated Dec. 23, 2011 for copending U.S. Appl. No. 12/975,452.
USPTO Notice of Allowance dated Apr. 2, 2012 for copending U.S. Appl. No. 12/975,452.
USPTO Notice of Allowance dated Dec. 8, 2011 for copending U.S. Appl. No. 12/981,960.
USPTO Notice of Allowance dated Mar. 15, 2012 for copending U.S. Appl. No. 12/981,960.
USPTO Notice of Allowance dated Dec. 13, 2011 for copending U.S. Appl. No. 12/966,487.
USPTO Notice of Allowance dated Apr. 13, 2012 for copending U.S. Appl. No. 12/966,487.
USPTO Notice of Allowance dated Dec. 12, 2011 for copending U.S. Appl. No. 12/966,502.
USPTO Notice of Allowance dated Dec. 9, 2011 for copending U.S. Appl. No. 12/966,512.

(56) References Cited

OTHER PUBLICATIONS

USPTO Notice of Allowance dated Mar. 21, 2012 for copending U.S. Appl. No. 12/966,512.
USPTO Notice of Allowance dated Jan. 9, 2012 for copending U.S. Appl. No. 12/975,482.
USPTO Office Action dated Jan. 30, 2012 for copending U.S. Appl. No. 12/975,443.
USPTO Office Action dated Nov. 10, 2011 for copending U.S. Appl. No. 12/975,484.
USPTO Notice of Allowance dated Apr. 18, 2012 for copending U.S. Appl. No. 12/975,484.
U.S. Appl. No. 61/405,306, filed Oct. 21, 2010, Rakesh Kumar Gupta, et al.
U.S. Appl. No. 61/405,312, filed Oct. 21, 2010, Rakesh Kumar Gupta, et al.
U.S. Appl. No. 61/588,744, filed Nov. 11, 2011, Clark et al.
U.S. Appl. No. 61/592,854, filed Jan. 31, 2012, Parker et al.
U.S. Appl. No. 61/592,867, filed Jan. 31, 2012, Parker et al.
U.S. Appl. No. 61/592,876, filed Jan. 31, 2012, Parker et al.
U.S. Appl. No. 61/592,917, filed Jan. 31, 2012, Parker et al.
U.S. Appl. No. 61/592,974, filed Jan. 31, 2012, Parker et al.
New copending U.S. Appl. No. 13/273,692, filed Oct. 14, 2011, Rakesh Kumar Gupta, et al.
New copending U.S. Appl. No. 13/273,648, filed Oct. 14, 2011, Rakesh Kumar Gupta, et al.
New copending U.S. Appl. No. 13/273,710, filed Oct. 14, 2011, Rakesh Kumar Gupta, et al.
New copending U.S. Appl. No. 13/273,720, filed Oct. 14, 2011, Rakesh Kumar Gupta, et al.
New copending U.S. Appl. No. 13/273,929, filed Oct. 14, 2011, Rakesh Kumar Gupta, et al.
New copending U.S. Appl. No. 13/273,937, filed Oct. 14, 2011, Rakesh Kumar Gupta, et al.
New copending U.S. Appl. No. 13/273,727, filed Oct. 14, 2011, Rakesh Kumar Gupta, et al.
New copending U.S. Appl. No. 13/273,737, filed Oct. 14, 2011, Rakesh Kumar Gupta, et al.
New copending U.S. Appl. No. 13/273,745, filed Oct. 14, 2011, Rakesh Kumar Gupta, et al.
New copending U.S. Appl. No. 13/273,749, filed Oct. 14, 2011, Rakesh Kumar Gupta, et al.
New copending U.S. Appl. No. 13/433,812, filed Mar. 29, 2012, Clark et al.
New copending U.S. Appl. No. 13/433,854, filed Mar. 29, 2012, Clark et al.
Investigation of the utility of islands-in-the-stream bicomponent fiber technology in the spunbound process. Fedorova, Dec. 2006 (retrieved on Mar. 20, 2012 from internet) pp. 22-23, 74 <URL: http://repository.lib.ncsu.edu/ir/bitstream/1840.16/5145/1/etd.pdf>.
"Choosing the Proper Short Cut Fiber", technical data sheet, MiniFibers, Inc., [online] pp. 1-2, 2006, [retrieved on Feb. 15, 2006], Retrieved from the Inernet: <URL: htts://www.minifibers.com/Literature/choosing_fiber.htm>.
USPTO Notice of Allowance dated Feb. 7, 2012 for copending U.S. Appl. No. 12/975,459.
USPTO Notice of Allowance dated Feb. 17, 2012 for copending U.S. Appl. No. 12/982,001.
USPTO Notice of Allowance dated Feb. 21, 2012 for copending U.S. Appl. No. 12/975,450.
USPTO Notice of Allowance dated Feb. 23, 2012 for copending U.S. Appl. No. 13/053,615.
USPTO Office Action dated Nov. 10, 2011 for copending U.S. Appl. No. 12/975,447.
USPTO Office Action dated Mar. 2, 2012 for copending U.S. Appl. No. 12/966,518.
Keith, James M., "Dispersions fo Synthetic Fibers in Wet-Lay Nonwovens". MiniFIBERS, Inc., originally published in the Tappi Journal, vol. 77, No. 6, Jun. 1994, entire document.
USPTO Office Action dated Jan. 25, 2008 for copending U.S. Appl. No. 11/343,955.
USPTO Office Action dated Oct. 10, 2008 for copending U.S. Appl. No. 11/343,955.
USPTO Notice of Allowance dated Mar. 9, 2009 for copending U.S. Appl. No. 11/343,955.
USPTO Notice of Allowance dated Aug. 7, 2009 for copending U.S. Appl. No. 11/343,955.
Copending U.S. Appl. No. 11/648,955, filed Jan. 3, 2007, Rakesh Kumar Gupta, et al.
USPTO Office Action dated May 21, 2012 for copending U.S. Appl. No. 12/981,982.
USPTO Office Action dated Oct. 4, 2012 for copending U.S. Appl. No. 13/273,745.
USPTO Office Action dated Nov. 26, 2012 for copending U.S. Appl. No. 13/273,648.
USPTO Office Action dated Nov. 20, 2012 for copending U.S. Appl. No. 13/273,710.
USPTO Office Action dated Nov. 7, 2012 for copending U.S. Appl. No. 13/273,720.
Database WPI Thomson Scientific, London, GB AN2004/520211 XP002639794 & JP 2004/137418 Dated May 13, 2004—abstract.
USPTO Notice of Allowance dated Jun. 4, 2012 for copending U.S. Appl. No. 12/981,960.
USPTO Notice of Allowance dated Jun. 7, 2012 for copending U.S. Appl. No. 12/966,487.
USPTO Notice of Allowance dated Jun. 11, 2012 for copending U.S. Appl. No. 12/966,512.
USPTO Notice of Allowance dated Jun. 13, 2012 for copending U.S. Appl. No. 12/966,502.
USPTO Notice of Allowance dated Jun. 29, 2012 for copending U.S. Appl. No. 12/981,950.
USPTO Notice of Allowance dated Jul. 3, 2012 for copending U.S. Appl. No. 12/974,452.
USPTO Office Action dated Jul. 5, 2012 for copending U.S. Appl. No. 12/966,507.
USPTO Notice of Allowance dated Jul. 6, 2012 for copending U.S. Appl. No. 12/975,456.
USPTO Notice of Allowance dated Jul. 27, 2012 for copending U.S. Appl. No. 12/981,982.
USPTO Office Action dated Aug. 14, 2012 for copending U.S. Appl. No. 12/199,304.
USPTO Notice of Allowance dated Jul. 19, 2012 for copending U.S. Appl. No. 12/981,950.
USPTO Notice of Allowance dated Aug. 10, 2012 for copending U.S. Appl. No. 12/975,487.
USPTO Notice of Allowance dated Jul. 31, 2012 for copending U.S. Appl. No. 12/975,456.
USPTO Office Action dated Aug. 27, 2012 for copending U.S. Appl. No. 12/975,443.
USPTO Office Action dated Aug. 28, 2012 for copending U.S. Appl. No. 12/975,447.
USPTO Notice of Allowance dated Oct. 11, 2012 for copending U.S. Appl. No. 12/975,487.
USPTO Notice of Allowance dated Oct. 22, 2012 for copending U.S. Appl. No. 12/966,518.
USPTO Notice of Allowance dated Nov. 2, 2012 for copending U.S. Appl. No. 12/966,507.
USPTO Office Action dated Nov. 2, 2012 for copending U.S. Appl. No. 13/273,692.
New co-pending U.S. Appl. No. 13/671,682, filed Nov. 8, 2012.
New co-pending U.S. Appl. No. 13/687,466, filed Nov. 28, 2012.
New co-pending U.S. Appl. No. 13/687,472, filed Nov. 28, 2012.
New co-pending U.S. Appl. No. 13/687,478, filed Nov. 28, 2012.
New co-pending U.S. Appl. No. 13/687,493, filed Nov. 28, 2012.
New co-pending U.S. Appl. No. 13/687,505, filed Nov. 28, 2012.
USPTO Office Action dated Dec. 4, 2012 for copending U.S. Appl. No. 13/273,749.
USPTO Notice of Allowance dated Dec. 10, 2012 for copending U.S. Appl. No. 12/966,521.
USPTO Notice of Allowance dated Jan. 8, 2013 for copending U.S. Appl. No. 12/966,483.
USPTO Notice of Allowance dated Jan. 10, 2013 for copending U.S. Appl. No. 12/975,447.

(56) References Cited

OTHER PUBLICATIONS

USPTO Notice of Allowance dated Jan. 15, 2013 for copending U.S. Appl. No. 12/975,463.
PCT International Search Report dated Jan. 23, 2013 for International Application No. PCT/US2012/064272.
USPTO Notice of Allowance dated Jan. 25, 2013 for copending U.S. Appl. No. 12/966,521.
USPTO Notice of Allowance dated Jan. 28, 2013 for copending U.S. Appl. No. 12/765,461.
USPTO Notice of Allowance dated Mar. 21, 2013 for copending U.S. Appl. No. 12/975,482.
USPTO Notice of Allowance dated Mar. 22, 2013 for copending U.S. Appl. No. 12/966,518.
PCT International Search Report dated Mar. 29, 2013 for International Application No. PCT/US2013/022830.
PCT International Search Report dated Mar. 27, 2013 for International Application No. PCT/US2013/022832.
PCT International Search Report dated Mar. 27, 2013 for International Application No. PCT/US2013/022834.
PCT International Search Report dated Mar. 27, 2013 for International Application No. PCT/US2013/022835.
PCT International Search Report dated Mar. 27, 2013 for International Application No. PCT/US2013/022838.
USPTO Notice of Allowance dated Mar. 28, 2013 for copending U.S. Appl. No. 12/966,521.
PCT International Search Report dated Mar. 29, 2013 for International Application No. PCT/US2013/021804.
USPTO Notice of Allowance dated Apr. 8, 2013 for copending U.S. Appl. No. 12/966,483.
USPTO Notice of Allowance dated Apr. 16, 2013 for copending U.S. Appl. No. 12/765,461.
USPTO Notice of Allowance dated Apr. 24, 2013 for copending U.S. Appl. No. 12/199,304.
USPTO Notice of Allowance dated May 1, 2013 for copending U.S. Appl. No. 12/975,482.
CFF Acrylic Pulps/Fibrillated Fibers, Datasheet [Online], Sterling Fibers, Feb. 7, 2011 [retrieved Mar. 4, 2013], <url: http://www.sterlingfibers.com/wetland.htm>.
USPTO Office Action dated Jun. 19, 2013 for copending U.S. Appl. No. 12/909,574.
New co-pending U.S. Appl. No. 13/941,816, filed Jul. 15, 2013.
USPTO Office Action dated Jul. 19, 2013 for copending U.S. Appl. No. 13/433,854.
USPTO Office Action dated Jul. 22, 2013 for copending U.S. Appl. No. 13/433,812.
USPTO Office Action dated Jul. 30, 2013 for copending U.S. Appl. No. 13/273,749.
USPTO Office Action dated Aug. 19, 2013 for copending U.S. Appl. No. 13/273,745.
Pettersson, Patrick, "Fluid Flow in Wood Fiber Networks," Lulea University of Technology, 2006:34, ISSN: 1402-1757.
USPTO Notice of Allowance dated Sep. 5, 2013 for copending U.S. Appl. No. 12/966,507.
USPTO Office Action dated Sep. 6, 2013 for copending U.S. Appl. No. 12/966,494.
USPTO Office Action dated Sep. 20, 2013 for copending U.S. Appl. No. 13/687,472.
USPTO Office Action dated Sep. 20, 2013 for copending U.S. Appl. No. 13/687,478.
USPTO Office Action dated Sep. 20, 2013 for copending U.S. Appl. No. 13/687,505.
USPTO Office Action dated Sep. 24, 2013 for copending U.S. Appl. No. 13/687,466.
USPTO Office Action dated Sep. 25, 2013 for copending U.S. Appl. No. 13/273,692.
USPTO Office Action dated Sep. 25, 2013 for copending U.S. Appl. No. 13/273,648.
USPTO Office Action dated Sep. 25, 2013 for copending U.S. Appl. No. 13/687,493.
USPTO Office Action dated Oct. 9, 2013 for copending U.S. Appl. No. 13/944,458.
USPTO Office Action dated Dec. 3, 2013 for copending U.S. Appl. No. 13/273,937.
USPTO Notice Allowance dated Dec. 4, 2013 for copending U.S. Appl. No. 12/975,484.
USPTO Co-pending U.S. Appl. No. 14/108,389, filed Dec. 17, 2013.
USPTO Office Action dated Dec. 31, 2013 for copending U.S. Appl. No. 13/352,362.
USPTO Notice of Allowance dated Feb. 4, 2014 for copending U.S. Appl. No. 12/975,484.
USPTO Office Action dated Feb. 10, 2014 for copending U.S. Appl. No. 13/433,854.
Extended European Search Report dated Feb. 25, 2014 for Application No./Patent No. 11835114.7-1303 / 2630297 PCT/US2011056997.
USPTO Office Action dated Mar. 7, 2014 for copending U.S. Appl. No. 12/966,494.
USPTO Office Action dated Mar. 13, 2014 for copending U.S. Appl. No. 12/909,574.
USPTO Office Action dated Mar. 25, 2014 for copending U.S. Appl. No. 13/273,727.
New Co-pending U.S. Appl. No. 14/249,858, filed Apr. 10, 2014.
New Co-pending U.S. Appl. No. 14/249,868, filed Apr. 10, 2014.
USPTO Office Action dated May 8, 2014 for copending U.S. Appl. No. 13/273,692.
USPTO Office Action dated May 8, 2014 for copending U.S. Appl. No. 13/273,648.
USPTO Notice of Allowance dated May 8, 2014 for copending U.S. Appl. No. 13/687,478.
USPTO Notice of Allowance dated May 13, 2014 for copending U.S. Appl. No. 13/687,472.
USPTO Notice of Allowance dated May 14, 2014 for copending U.S. Appl. No. 13/687,466.
USPTO Notice of Allowance dated May 23, 2014 for copending U.S. Appl. No. 13/687,493.
USPTO Office Action dated Jun. 19, 2014 for copending U.S. Appl. No. 13/671,682.
USPTO Notice of Allowance dated Jun. 19, 2014 for copending U.S. Appl. No. 13/687,505.
USPTO Officce Action dated Jul. 15, 2014 for copending U.S. Appl. No. 13/273,737.
USPTO Office Action dated Jul. 18, 2014 for copending U.S. Appl. No. 13/944,458.
USPTO Office Action dated Jul. 31, 2014 for co-pending U.S. Appl. No. 13/273,937.
USPTO Office Action dated Aug. 4, 2014 for co-pending U.S. Appl. No. 13/352,362.
Extended European Search Report dated Aug. 6, 2014 for Application No./Patent No. 11835104.8-1308 / 2630284 PCT/US2011056984.
Extended European Search Report dated Aug. 6, 2014 for Application No./Patent No. 11835106.3-1308 / 2629950 PCT/US2011056986.
Extended European Search Report dated Aug. 6, 2014 for Application No./Patent No. 11835107.1-1308 / 2630288 PCT/US2011056987.
PCT International Search Report dated Aug. 28, 2014 for International Application No. PCT/US2014/033771.
New Co-pending U.S. Appl. No. 14/490,084, filed Sep. 18, 2014.
USPTO Office Action dated Sep. 26, 2014 for co-pending U.S. Appl. No. 13/273,727.
USPTO Office Action dated Nov. 20, 2014 for co-pending U.S. Appl. No. 14/249,868.
USPTO Office Action dated Nov. 21, 2014 for co-pending U.S. Appl. No. 14/249,858.
USPTO Office Action dated Dec. 4, 2014 for co-pending U.S. Appl. No. 14/490,084.
USPTO Office Action dated Dec. 15, 2014 for co-pending U.S. Appl. No. 13/433,854.
USPTO Office Action dated Feb. 11, 2015 for co-pending U.S. Appl. No. 13/273,692.

(56) References Cited

OTHER PUBLICATIONS

USPTO Office Action dated Feb. 11, 2105 for co-pending U.S. Appl. No. 13/273,648.
Notification of Transmittal of the International Search Report and the Written Opinion of the International Search Report and the Written Opinion of the International Searching Authority, or the Declaration—International Application No. PCT/US2014/069888 with a Mailing Date of Mar. 2, 2015.
USPTO Office Action dated May 4, 2015 for co-pending U.S. Appl. No. 13/352,362.
USPTO Office Action dated Jul. 9, 2015 for co-pending U.S. Appl. No. 13/671,682.
USPTO Notice of Allowance dated Jul. 13, 2015 for co-pedning U.S. Appl. No. 14/490,084.
USPTO Office Action dated Jul. 23, 2015 for co-pending U.S. Appl. No. 14/249,858.
USPTO Office Action dated Jul. 23, 2015 for co-pending U.S. Appl. No. 14/249,868.
Extended European Search Report dated Jul. 20, 2015 for Application No./Patent No. 12847445.9-1306 / 2776615 PCT/US2012064272.
USPTO Office Action dated Aug. 28, 2015 for co-pending U.S. Appl. No. 13/273,692.
USPTO Office Action dated Aug. 28, 2015 for co-pending U.S. Appl. No. 13/276,648.
USPTO Office Action dated Sep. 11, 2015 for co-pending U.S. Appl. No. 13/273,737.
USPTO Office Action dated Sep. 16, 2015 for co-pending U.S. Appl. No. 13/273,929.
USPTO Office Action dated Sep. 17, 2015 for co-pending U.S. Appl. No. 13/433,854.
USPTO Office Action dated Sep. 29, 2015 for co-pending U.S. Appl. No. 13/941,816.
USPTO Office Action dated Sep. 30, 2015 for co-pending U.S. Appl. No. 13/273,727.
USPTO Office Action dated Nov. 2, 2015 for co-pending U.S. Appl. No. 12/909,574.
USPTO Notice of Allowance dated Nov. 13, 2015 for co-pending U.S. Appl. No. 13/273,937.
USPTO Notice of Allowance dated Feb. 18, 2016 for co-pending U.S. Appl. No. 14/249,858.
USPTO Office Action dated Mar. 28, 2016 for co-pending U.S. Appl. No. 13/273,929.
USPTO Office Action dated Mar. 30, 2016 for co-pending U.S. Appl. No. 13/273,737.
USPTO Office Action dated Apr. 12, 2016 for co-pending U.S. Appl. No. 14/249,868.
USPTO Office Action dated Jun. 13, 2016 for co-pending U.S. Appl. No. 13/433,854.
USPTO Office Action dated Aug. 26, 2016 for co-pending U.S. Appl. No. 13/273,648.
USPTO Office Action dated Aug. 26, 2016 for co-pending U.S. Appl. No. 13/273,692.

\* cited by examiner

ULTRAFILTRATION PROCESS FOR THE RECOVERY OF CONCENTRATED SULFOPOLYESTER DISPERSION

FIELD OF THE INVENTION

The present invention generally pertains to processes for recovering a concentrated sulfopolyester dispersion from aqueous dispersion comprising sulfopolyester and water. The present invention further pertains to the recovered sulfopolyesters, concentrated sulfopolyester dispersions, and articles comprising recovered sulfopolyesters and/or concentrated sulfopolyester dispersions.

BACKGROUND OF THE INVENTION

Water-dispersible polymers, particularly sulfopolyester polymers, are used in the formation of fibers and fibrous articles such as non-woven fabric, bicomponent fibers, films, clothing articles, personal care products such as wipes, feminine hygiene products, diapers, adult incontinence briefs, hospital/surgical and other medical disposables, protective fabrics and layers, geotextiles, industrial wipes, and filter media. Oftentimes, many of these items are washed during the course of their manufacture or use. As a result, significant quantities of the sulfopolyester polymers become liberated from the articles and dispersed in the wash water.

For example, multicomponent fibers comprising a water-dispersible sulfopolyester and a water non-dispersible polymer, such as polyester, nylon or polyolefins, can be used in the manufacture of microdenier fibers and microdenier fiber webs. These fibers have been described, for example, in U.S. Pat. Nos. 6,989,193, 7,902,094, 7,892,993, and 8,513,147. The multicomponent fibers can be laid into a non-woven web which may be transformed into a microdenier fiber web by removing the sulfopolyester component of the fibers. This is most commonly accomplished by washing the web thereby causing the sulfopolyester to disassociate from the multicomponent fibers from which the web is made. The disassociated sulfopolyester becomes dispersed in the wash water.

The sulfopolyester dispersion is generally very dilute exhibiting only a very modest concentration of sulfopolyester. Heretofore, the sulfopolyester present in the wash water has been considered to be of little economic value and is typically discarded along with the wash water. Accordingly, there is a need for an economically viable and efficient method for concentrating and/or recovering the sulfopolyester from the wash water for subsequent reuse.

BRIEF SUMMARY OF THE INVENTION

The present invention overcomes the previously described problems by providing methods of recovering water-dispersible sulfopolyester from aqueous dispersions. Concentrated sulfopolyester dispersions made from aqueous dispersions comprising sulfopolyesters are also provided.

It is, therefore, an object of the present invention to provide methods for recovering a concentrated sulfopolyester dispersion from an aqueous dispersion.

It is another object of the present invention to recover sulfopolyester contained in the concentrated aqueous dispersion for reuse in a manufacturing process.

It is yet another object of the present invention to provide the concentrated sulfopolyester dispersions, recovered sulfopolyester polymers, and articles manufactures from the recovered sulfopolyester and/or concentrated sulfopolyester dispersions.

It should be understood that the above-listed objects are only exemplary, and not all the objects listed above need be accomplished by the invention described and claimed herein.

In accordance with one embodiment of this invention, a process for recovering a concentrated sulfopolyester dispersion is provided comprising routing an aqueous dispersion comprising a water-dispersible sulfopolyester to a sulfopolyester concentration zone to remove water from the aqueous dispersion to produce the concentrated sulfopolyester dispersion; wherein the sulfopolyester concentration zone comprises at least one ultrafiltration membrane.

In another embodiment of the present invention, a process to produce a concentrated sulfopolyester dispersion is provided comprising (a) washing an article comprising a water-dispersible sulfopolyester thereby disassociating at least a portion of the sulfopolyester from the article and forming an aqueous dispersion comprising the disassociated sulfopolyester; and (b) removing water from the aqueous dispersion in a sulfopolyester concentration zone to form a concentrated sulfopolyester dispersion having a sulfopolyester concentration that is greater than the aqueous dispersion; wherein the sulfopolyester concentration zone comprises at least one ultrafiltration membrane.

In another embodiment according to the present invention, a process to recover a sulfopolyester polymer is provided comprising (a) forming an aqueous dispersion comprising a water-dispersible sulfopolyester; (b) removing water from the aqueous dispersion in a sulfopolyester concentration zone to form a concentrated sulfopolyester dispersion having a sulfopolyester concentration that is at least twice that of the aqueous dispersion; wherein the sulfopolyester concentration zone comprises at least one ultrafiltration membrane; and (c) recovering at least a portion of said sulfopolyester polymer from said concentrated sulfopolyester dispersion.

In another embodiment according to present invention, a recovered sulfopolyester of sufficiently good quality is provided so as to be of use in article of manufacture, for example, fibers, nonwovens, films, textiles, adhesives and the likes.

DETAILED DESCRIPTION

Figure 1:
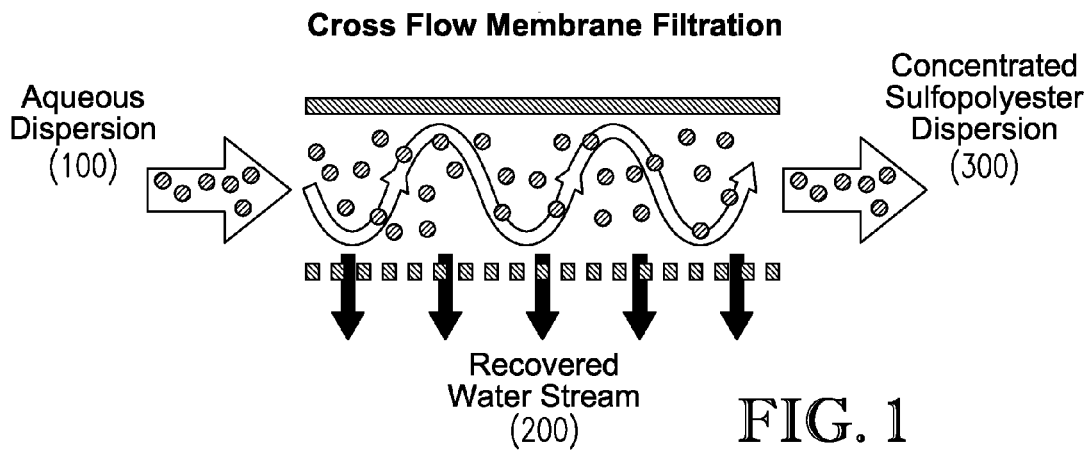
FIG. 1 illustrates an embodiment of the sulfopolyester concentration zone comprising a cross-flow membrane.

The present invention provides processes for recovering a concentrated sulfopolyester dispersion from an aqueous dispersion comprising water-dispersible sulfopolyester and water. In one embodiment of the present invention, processes are provided for forming a concentrated sulfopolyester dispersion from an aqueous dispersion from which the sulfopolyester is recovered. In another embodiment, the aqueous dispersion from which the sulfopolyester is to be concentrated and/or recovered is formed from an industrial process whereby a water-dispersible sulfopolyester polymer becomes dispersed by the action of water. In another embodiment, the sulfopolyester is initially contained within an article that comprises a water-dispersible sulfopolyester. For example, this article comprises sulfopolyester as one component of a multicomponent fiber. Multicomponent fibers comprising a water-dispersible sulfopolyester and a water non-dispersible polymer, such as polyester, nylon or polyolefins, can be used in the manufacture of microdenier fibers and microdenier fiber webs. These fibers have been described, for example, in the following patents and patents applications: U.S. Pat. Nos. 6,989,193; 7,635,745; 7,902,094; 7,892,993; 7,687,143; and U.S. patent application Ser. Nos. 12/199,304; 12/909,574; 13/273,692; 13/273,648; 13/273,710; 13/273,720; 13/273,929; 13/273,937; 13/273,727, 13/273,737; 13/273,745; 13/273,749; 12/966,502; 12/966,507; 12/975,450; 12/975,452; 12/975,456; 13/053,615; 13/352,362; 13/433,812; 13/433,854; 61/471,259; 61/472,964; and 61/558,744, which are all hereby incorporated by reference to the extent they do not contradict the statements herein. The multicomponent fibers can be laid into a non-woven web which may be transformed into a microdenier fiber web by removing the sulfopolyester component of the fibers. This is most commonly accomplished by washing the web thereby causing the sulfopolyester to disassociate from the multicomponent fibers from which the web is made. The disassociated sulfopolyester becomes dispersed in the wash water.

As used herein, the term "water-dispersible" in reference to the sulfopolyester polymer is intended to be synonymous with the terms "water-dissipatable", "water-disintegratable", "water-dissolvable", "water-dispellable", "water soluble", "water-removable", "hydro-soluble", and "hydrodispersible". It is also intended to mean that the sulfopolyester component is removed from the article or multicomponent fiber and is dispersed or dissolved by the action of water. In the case of a multicomponent fiber, the sulfopolyester is removed so as to enable the release and separation of the water non-dispersible fibers contained therein. The terms "dispersed", "dispersible", "dissipate", or "dissipatable" mean that, using a sufficient amount of deionized water (e.g., 100:1 water:fiber by weight) to form a loose suspension or slurry of the fibers or fibrous article, at a temperature of about 60° C., and within a time period of up to 5 days, the sulfopolyester component dissolved, disintegrates, disassociates, or separates from the multicomponent fiber, leaving behind a plurality of microdenier fibers from the water non-dispersible segments.

As used herein, the term "aqueous dispersion" means that sulfopolyester has been dispersed in water and no further process steps have been taken to increase the concentration of sulfopolyester.

As used herein, the term "concentrated sulfopolyester dispersion" means that the aqueous dispersion has been further processed to remove water to increase the concentration of the sulfopolyester.

In one embodiment of the invention, a process for recovering a concentrated sulfopolyester dispersion is provided comprising routing an aqueous dispersion comprising a water-dispersible sulfopolyester and water to a sulfopolyester concentration zone to remove water from the aqueous dispersion to produce the concentrated sulfopolyester dispersion; wherein the sulfopolyester concentration zone comprises at least one ultrafiltration membrane.

The water-dispersible sulfopolyesters contained in the aqueous dispersions of the present invention comprise dicarboxylic acid monomer residues, sulfomonomer residues, diol monomer residues, and repeating units. The sulfomonomer may be a dicarboxylic acid, a diol, or hydroxy-carboxylic acid. Thus, the term "monomer residue", as used herein, means a residue of a dicarboxylic acid, a diol, or a hydroxyl-carboxylic acid. A "repeating unit", as used herein, means an organic structure having 2 monomer residues bonded through a carbonyloxy group. The sulfopolyesters of the present invention contain substantially equal molar proportions of acid residues (100 mole %) and diol residues (100 mole %) which react in substantially equal proportions such that the total moles of repeating units is equal to 100 mole %. The mole percentages provided in the present disclosure, therefore, may be based on the total moles of acid residues, the total moles of diol residues, or the total moles of repeating units. For example, a sulfopolyester containing 30 mole % of a sulfomonomer, which may be a dicarboxylic acid, a diol, or hydroxycarboxylic acid, based on the total repeating units, means that the sulfopolyester contains 30 mole % sulfomonomer out of a total of 100 mole % repeating units. Thus, there are 30 moles of sulfomonomer residues among every 100 moles of repeating units. Similarly, a sulfopolyester containing 30 mole % of a dicarboxylic acid sulfomonomer, based on the total acid residues, means the sulfopolyester contains 30 mole % sulfomonomer out of a total of 100 mole % acid residues. Thus, in this latter case, there are 30 moles of sulfomonomer residues among every 100 moles of acid residues.

The sulfopolyesters described herein have an inherent viscosity, abbreviated hereinafter as "Ih.V.", of at least about 0.1 dL/g, preferably about 0.2 to 0.3 dL/g, and most preferably greater than about 0.3 dL/g, measured in a 60/40 parts by weight solution of phenol/tetrachloroethane solvent at 25° C. and at a concentration of about 0.5 g of sulfopolyester in 100 mL of solvent. The term "polyester", as used herein, encompasses both "homopolyesters" and "copolyesters" and means a synthetic polymer prepared by the polycondensation of difunctional carboxylic acids with difunctional hydroxyl compound. As used herein, the term "sulfopolyester" means any polyester comprising a sulfomonomer.

Typically the difunctional carboxylic acid is a dicarboxylic acid and the difunctional hydroxyl compound is a dihydric alcohol such as, for example glycols and diols. Alternatively, the difunctional carboxylic acid may be a hydroxy carboxylic acid such as, for example, p-hydroxybenzoic acid, and the difunctional hydroxyl compound may be an aromatic nucleus bearing 2 hydroxy substituents such as, for example, hydroquinone. The term "residue", as used herein, means any organic structure incorporated into the polymer through a polycondensation reaction involving the corresponding monomer. Thus, the dicarboxylic acid residue may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a high molecular weight polyester.

The sulfopolyester of the present invention includes one or more dicarboxylic acid residues. Depending on the type and concentration of the sulfomonomer, the dicarboxylic acid residue may comprise from about 60 to about 100 mole % of the acid residues. Other examples of concentration ranges of dicarboxylic acid residues are from about 60 mole % to about 95 mole %, and about 70 mole % to about 95 mole %. Examples of dicarboxylic acids that may be used include aliphatic dicarboxylic acids, alicyclic dicarboxylic acids, aromatic dicarboxylic acids, or mixtures of two or more of these acids. Thus, suitable dicarboxylic acids include, but are not limited to, succinic; glutaric; adipic; azelaic; sebacic; fumaric; maleic; itaconic; 1,3-cyclohexanedicarboxylic; 1,4-cyclohexanedicarboxylic; diglycolic; 2,5-norbornane-dicarboxylic; phthalic; terephthalic; 1,4-naphthalenedicarboxylic; 2,5-naphthalenedicarboxylic; diphenic; 4,4'-oxydibenzoic; 4,4'-sulfonyidibenzoic; and isophthalic. The preferred dicarboxylic acid residues are isophthalic, terephthalic, and 1,4-cyclohexanedicarboxylic acids, or if diesters are used, dimethyl terephthalate, dimethyl isophthalate, and dimethyl-1,4-cyclohexane-dicarboxylate with the residues of isophthalic and terephthalic acid being especially preferred. Although the dicarboxylic acid methyl ester is the most preferred embodiment, it is also acceptable to include higher order alkyl esters, such as ethyl, propyl, isopropyl, butyl, and so forth. In addition, aromatic esters, particularly phenyl, also may be employed.

The sulfopolyester includes about 4 to about 40 mole %, based on the total repeating units, of residues of at least one sulfomonomer having 2 functional groups and one or more sulfonate groups attached to an aromatic or cycloaliphatic ring wherein the functional groups are hydroxyl, carboxyl, or a combination thereof. Additional examples of concentration ranges for the sulfomonomer residues are about 4 to about 35 mole %, about 8 to about 30 mole %, and about 8 to about 25 mole %, based on the total repeating units. The sulfomonomer may be a dicarboxylic acid or ester thereof containing a sulfonate group, a diol containing a sulfonate group, or a hydroxy acid containing a sulfonate group. The term "sulfonate" refers to a salt of a sulfonic acid having the structure "—$SO_3M$" wherein M is the cation of the sulfonate salt. The cation of the sulfonate salt may be a metal ion such as $Li^+$, $Na^+$, $K^+$, $Mg^{++}$, $Ca^{++}$, $Ni^{++}$, $Fe^{++}$, and the like. Alternatively, the cation of the sulfonate salt may be nonmetallic such as a nitrogenous base as described, for example, in U.S. Pat. No. 4,304,901. Nitrogen-based cations are derived from nitrogen-containing bases, which may be aliphatic, cycloaliphatic, or aromatic compounds. Examples of such nitrogen containing bases include ammonia, dimethylethanolamine, diethanolamine, triethanolamine, pyridine, morpholine, and piperidine. Because monomers containing the nitrogen-based sulfonate salts typically are not thermally stable at conditions required to make the polymers in the melt, the method of this invention for preparing sulfopolyesters containing nitrogen-based sulfonate salt groups is to disperse, dissipate, or dissolve the polymer containing the required amount of sulfonate group in the form of its alkali metal salt in water and then exchange the alkali metal cation for a nitrogen-based cation.

When a monovalent alkali metal ion is used as the cation of the sulfonate salt, the resulting sulfopolyester is completely dispersible in water with the rate of dispersion dependent on the content of sulfomonomer in the polymer, temperature of the water, surface area/thickness of the sulfopolyester, and so forth. When a divalent metal ion is used, the resulting sulfopolyesters are not readily dispersed by cold water but are more easily dispersed by hot water. Utilization of more than one counterion within a single polymer composition is possible and may offer a means to tailor or fine-tune the water-responsivity of the resulting article of manufacture. Examples of sulfomonomers residues include monomer residues where the sulfonate salt group is attached to an aromatic acid nucleus, such as, for example, benzene; naphthalene; diphenyl; oxydiphenyl; sulfonyldiphenyl; and methylenediphenyl or cycloaliphatic rings, such as, for example, cyclohexyl; cyclopentyl; cyclobutyl; cycloheptyl; and cyclooctyl. Other examples of sulfomonomer residues which may be used in the present invention are the metal sulfonate salt of sulfophthalic acid, sulfoterephthalic acid, sulfoisophthalic acid, or combinations thereof. Other examples of sulfomonomers which may be used are 5-sodiosulfoisophthalic acid and esters thereof. If the sulfomonomer residue is from 5-sodiosulfoisophthalic acid, typical sulfomonomer concentration ranges are about 4 to about 35 mole %, about 8 to about 30 mole %, and about 8 to 25 mole %, based on the total moles of acid residues.

The sulfomonomers used in the preparation of the sulfopolyesters are known compounds and may be prepared using methods well known in the art. For example, sulfomonomers in which the sulfonate group is attached to an aromatic ring may be prepared by sulfonating the aromatic compound with oleum to obtain the corresponding sulfonic acid and followed by reaction with a metal oxide or base, for example, sodium acetate, to prepare the sulfonate salt. Procedures for preparation of various sulfomonomers are described, for example, in U.S. Pat. Nos. 3,779,993; 3,018,272; and 3,528,947.

It is also possible to prepare the polyester using, for example, a sodium sulfonate salt, and ion-exchange methods to replace the sodium with a different ion, such as zinc, when the polymer is in the dispersed form. This type of ion exchange procedure is generally superior to preparing the polymer with divalent salts insofar as the sodium salts are usually more soluble in the polymer reactant melt-phase.

The sulfopolyester includes one or more diol residues which may include aliphatic, cycloaliphatic, and aralkyl glycols. The cycloaliphatic diols, for example, 1,3- and 1,4-cyclohexanedimethanol, may be present as their pure cis or trans isomers or as a mixture of cis and trans isomers. As used herein, the term "diol" is synonymous with the term "glycol" and means any dihydric alcohol. Examples of diols include, but are not limited to, ethylene glycol; diethylene glycol; triethylene glycol; polyethylene glycols; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propane-diol; 1,3-butanediol; 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol, or combinations of one or more of these glycols.

The diol residues may include from about 25 mole % to about 100 mole %, based on the total diol residues, of residue of a poly(ethylene glycol) having a structure

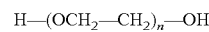

wherein n is an integer in the range of 2 to about 500. Non-limiting examples of lower molecular weight polyethylene glycols, e.g., wherein n is from 2 to 6, are diethylene glycol, triethylene glycol, and tetraethylene glycol. Of these lower molecular weight glycols, diethylene and triethylene glycol are most preferred. Higher molecular weight polyethylene glycols (abbreviated herein as "PEG"), wherein n is from 7 to about 500, include the commercially available products known under the designation CARBOWAX®, a product of Dow Chemical Company (formerly Union Carbide). Typically, PEGs are used in combination with other diols such as, for example, diethylene glycol or ethylene glycol. Based on the values of n, which range from greater than 6 to 500, the molecular weight may range from greater than 300 to about 22,000 g/mol. The molecular weight and the mole % are inversely proportional to each other; specifically, as the molecular weight is increased, the mole % will be decreased in order to achieve a designated degree of hydrophilicity. For example, it is illustrative of this concept to consider that a PEG having a molecular weight of 1000 may constitute up to 10 mole % of the total diol, while a PEG having a molecular weight of 10,000 would typically be incorporated at a level of less than 1 mole % of the total diol.

Certain dimer, trimer, and tetramer diols may be formed in situ due to side reactions that may be controlled by varying the process conditions. For example, varying amounts of diethylene, triethylene, and tetraethylene glycols may be formed from ethylene glycol from an acid-catalyzed dehydration reaction which occurs readily when the polycondensation reaction is carried out under acidic conditions. The presence of buffer solutions, well-known to those skilled in the art, may be added to the reaction mixture to retard these side reactions. Additional compositional latitude is possible, however, if the buffer is omitted and the dimerization, trimerization, and tetramerization reactions are allowed to proceed.

The sulfopolyester of the present invention may include from 0 to about 25 mole %, based on the total repeating units, of residues of a branching monomer having 3 or more functional groups wherein the functional groups are hydroxyl, carboxyl, or a combination thereof. Non-limiting examples of branching monomers are 1,1,1-trimethylol propane, 1,1,1-trimethylolethane, glycerin, pentaerythritol, erythritol, threitol, dipentaerythritol, sorbitol, trimellitic anhydride, pyromellitic dianhydride, dimethylol propionic acid, or combinations thereof. Further examples of branching monomer concentration ranges are from 0 to about 20 mole % and from 0 to about 10 mole %. The presence of a branching monomer may result in a number of possible benefits to the sulfopolyester of the present invention, including but not limited to, the ability to tailor rheological, solubility, and tensile properties. For example, at a constant molecular weight, a branched sulfopolyester, compared to a linear analog, will also have a greater concentration of end groups that may facilitate post-polymerization crosslinking reactions. At high concentrations of branching agent, however, the sulfopolyester may be prone to gelation.

The sulfopolyester of the present invention has a glass transition temperature, abbreviated herein as "Tg", of at least 25° C. as measured on the dry polymer using standard techniques, such as differential scanning calorimetry ("DSC"), well known to persons skilled in the art. The Tg measurements of the sulfopolyesters of the present invention are conducted using a "dry polymer", that is, a polymer sample in which adventitious or absorbed water is driven off by heating to polymer to a temperature of about 200° C. and allowing the sample to return to room temperature. Typically, the sulfopolyester is dried in the DSC apparatus by conducting a first thermal scan in which the sample is heated to a temperature above the water vaporization temperature, holding the sample at that temperature until the vaporization of the water absorbed in the polymer is complete (as indicated by an a large, broad endotherm), cooling the sample to room temperature, and then conducting a second thermal scan to obtain the Tg measurement. Further examples of glass transition temperatures exhibited by the sulfopolyester are at least 30° C., at least 35° C., at least 40° C., at least 50° C., at least 60° C., at least 65° C., at least 80° C., and at least 90° C. Although other Tg's are possible, typical glass transition temperatures of the dry sulfopolyesters our invention are about 30° C., about 48° C., about 55° C., about 65° C., about 70° C., about 75° C., about 85° C., and about 90° C.

The water-dispersible sulfopolyester can also have a glass transition temperature (Tg) of at least 25° C., wherein the sulfopolyester comprises:

(A) about 50 to about 96 mole %, of one or more residues of isophthalic acid or terephthalic acid, based on the total acid residues;

(B) about 4 to about 30 mole %, based on the total acid residues, of a residue of sod iosulfoisophthalic acid;

(C) one or more diol residues wherein at least 25 mole %, based on the total diol residues, is a poly(ethylene glycol) having a structure

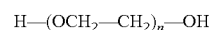

wherein n is an integer in the range of 2 to about 500; (iv) 0 to about 20 mole %, based on the total repeating units, of residues of a branching monomer having 3 or more functional groups wherein the functional groups are hydroxyl, carboxyl, or a combination thereof. The sulfopolyester should have a glass transition temperature (Tg) of at least 25° C., but may have, for example, a Tg of about 35° C., about 48° C., about 55° C., about 65° C., about 70° C., about 75° C., about 85° C., and about 90° C. The sulfopolyester may contain other concentrations of isophthalic acid residues, for example, about 60 to about 95 mole %, and about 75 to about 95 mole %. Further examples of isophthalic acid residue concentrations ranges are about 70 to about 85 mole %, about 85 to about 95 mole % and about 90 to about 95 mole %. The sulfopolyester also may comprise about 25 to about 95 mole % of the residues of diethylene glycol. Further examples of diethylene glycol residue concentration ranges include about 50 to about 95 mole %, about 70 to about 95 mole %, and about 75 to about 95 mole %. The sulfopolyester also may include the residues of ethylene glycol and/or 1,4-cyclohexanedimethanol, abbreviated herein as "CHDM". Typical concentration ranges of CHDM residues are about 10 to about 75 mole %, about 25 to about 65 mole %, and about 40 to about 60 mole %. Typical concentration ranges of ethylene glycol residues are about 10 to about 75 mole %, about 25 to about 65 mole %, and about 40 to about 60 mole %. In another embodiment, the sulfopolyester comprises is about 75 to about 96 mole % of the residues of isophthalic acid and about 25 to about 95 mole % of the residues of diethylene glycol.

The sulfopolyesters of the instant invention are readily prepared from the appropriate dicarboxylic acids, esters, anhydrides, or salts, sulfomonomer, and the appropriate diol or diol mixtures using typical polycondensation reaction conditions. They may be made by continuous, semi-continuous, and batch modes of operation and may utilize a variety of reactor types. Examples of suitable reactor types include, but are not limited to, stirred tank, continuous stirred tank, slurry, tubular, wiped-film, falling film, or extrusion reactors. The term "continuous" as used herein means a process wherein reactants are introduced and products withdrawn simultaneously in an uninterrupted manner. By "continuous" it is meant that the process is substantially or completely continuous in operation and is to be contrasted with a "batch" process. "Continuous" is not meant in any way to prohibit normal interruptions in the continuity of the process due to, for example, start-up, reactor maintenance, or scheduled shut down periods. The term "batch" process as used herein means a process wherein all the reactants are added to the reactor and then processed according to a predetermined course of reaction during which no material is fed or removed into the reactor. The term "semicontinuous" means a process where some of the reactants are charged at the beginning of the process and the remaining reactants are fed continuously as the reaction progresses. Alternatively, a semicontinuous process may also include a process similar to a batch process in which all the reactants are added at the beginning of the process except that one or more of the products are removed continuously as the reaction progresses. The process is operated advantageously as a continuous process for economic reasons and to produce superior coloration of the polymer as the sulfopolyester may deteriorate in appearance if allowed to reside in a reactor at an elevated temperature for too long a duration.

The sulfopolyesters of the present invention are prepared by procedures known to persons skilled in the art. The sulfomonomer is most often added directly to the reaction mixture from which the polymer is made, although other processes are known and may also be employed, for example, as described in U.S. Pat. Nos. 3,018,272, 3,075,952, and 3,033,822. The reaction of the sulfomonomer, diol component and the dicarboxylic acid component may be carried out using conventional polyester polymerization conditions. For example, when preparing the sulfopolyesters by means of an ester interchange reaction, i.e., from the ester form of the dicarboxylic acid components, the reaction process may comprise two steps. In the first step, the diol component and the dicarboxylic acid component, such as, for example, dimethyl isophthalate, are reacted at elevated temperatures, typically, about 150° C. to about 250° C. for about 0.5 to about 8 hours at pressures ranging from about 0.0 kPa gauge to about 414 kPa gauge (60 pounds per square inch, "psig"). Preferably, the temperature for the ester interchange reaction ranges from about 180° C. to about 230° C. for about 1 to about 4 hours while the preferred pressure ranges from about 103 kPa gauge (15 psig) to about 276 kPa gauge (40 psig). Thereafter, the reaction product is heated under higher temperatures and under reduced pressure to form sulfopolyester with the elimination of diol, which is readily volatilized under these conditions and removed from the system. This second step, or polycondensation step, is continued under higher vacuum and a temperature which generally ranges from about 230° C. to about 350° C., preferably about 250° C. to about 310° C. and most preferably about 260° C. to about 290° C. for about 0.1 to about 6 hours, or preferably, for about 0.2 to about 2 hours, until a polymer having the desired degree of polymerization, as determined by inherent viscosity, is obtained. The polycondensation step may be conducted under reduced pressure which ranges from about 53 kPa (400 torr) to about 0.013 kPa (0.1 torr). Stirring or appropriate conditions are used in both stages to ensure adequate heat transfer and surface renewal of the reaction mixture. The reactions of both stages are facilitated by appropriate catalysts such as, for example, alkoxy titanium compounds, alkali metal hydroxides and alcoholates, salts of organic carboxylic acids, alkyl tin compounds, metal oxides, and the like. A three-stage manufacturing procedure, similar to that described in U.S. Pat. No. 5,290,631, may also be used, particularly when a mixed monomer feed of acids and esters is employed.

To ensure that the reaction of the diol component and dicarboxylic acid component by an ester interchange reaction mechanism is driven to completion, it is preferred to employ about 1.05 to about 2.5 moles of diol component to one mole dicarboxylic acid component. Persons of skill in the art will understand, however, that the ratio of diol component to dicarboxylic acid component is generally determined by the design of the reactor in which the reaction process occurs.

In the preparation of sulfopolyester by direct esterification, i.e., from the acid form of the dicarboxylic acid component, sulfopolyesters are produced by reacting the dicarboxylic acid or a mixture of dicarboxylic acids with the diol component or a mixture of diol components. The reaction is conducted at a pressure of from about 7 kPa gauge (1 psig) to about 1379 kPa gauge (200 psig), preferably less than 689 kPa (100 psig) to produce a low molecular weight, linear or branched sulfopolyester product having an average degree of polymerization of from about 1.4 to about 10. The temperatures employed during the direct esterification reaction typically range from about 180° C. to about 280° C., more preferably ranging from about 220° C. to about 270° C. This low molecular weight polymer may then be polymerized by a polycondensation reaction.

Figure 2:
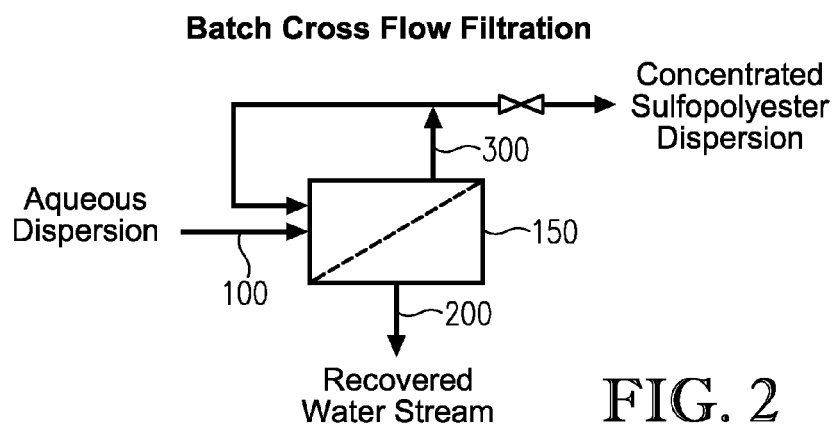
FIG. 2 illustrates an embodiment of the sulfopolyester concentration zone comprising a batch cross-flow membrane process.
Figure 3:
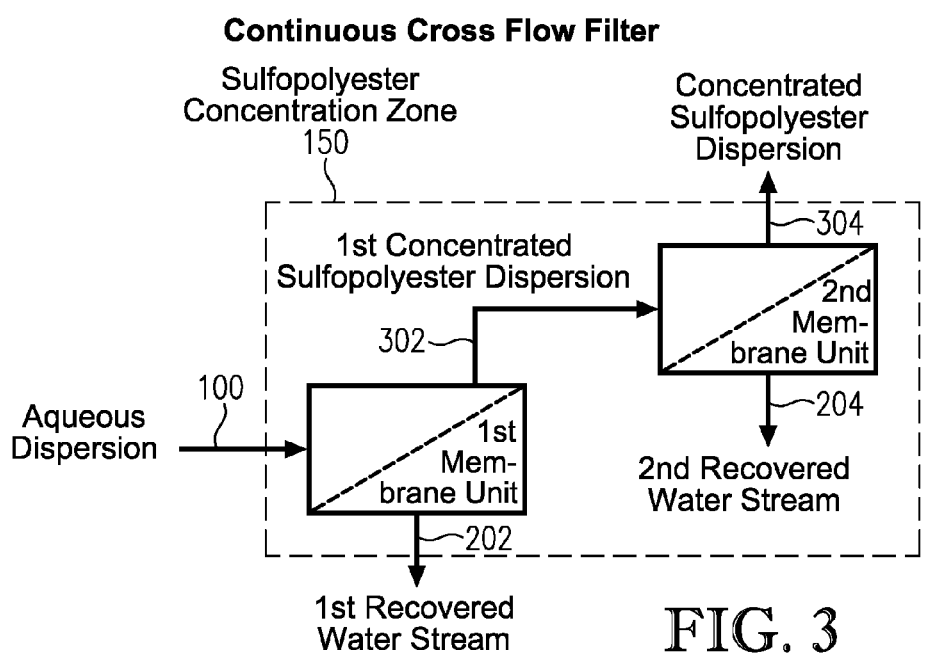
FIG. 3 illustrates an embodiment of the sulfopolyester concentration zone comprising a continuous cross-flow membrane process with a first membrane unit and a second membrane unit.

In one embodiment of the invention, a process is provided to recover a concentrated sulfopolyester dispersion (300) comprising routing the aqueous dispersion (100) comprising water-dispersible sulfopolyester to a sulfopolyester concentration zone (150) to remove water from the aqueous dispersion (100) to produce the concentrated sulfopolyester dispersion (300) and a recovered water stream (200); wherein the sulfopolyester concentration zone (150) comprises at least one ultrafiltration membrane. Embodiments of this process are shown in FIGS. 2-3.

In one embodiment of the invention, the aqueous dispersion (100) comprises water-dispersible sulfopolyester in the range from about 0.25 wt. % to about 25 wt. %, about 0.5 wt. % to about 20 wt. %, from about 0.5 wt. % to about 15 wt. %, from about 0.5 wt. % to about 10 wt. %, from about 0.5 wt. % to about 8 wt. %, from about 0.5 wt. % to about 6 wt. %, and from about 0.5 wt. % to about 4 wt. %. The aqueous dispersion may be formed by washing an article comprising the sulfopolyester in water, for example, deionized water, thereby disassociating at least a portion of the sulfopolyester from the article. Typically, the washing process comprises contacting the article with water at a temperature of about 25° C. to about 100° C. or from about 40° C. to about 80° C., for a period of time from about 10 to about 600 seconds whereby the sulfopolyester is dissipated or dissolved. The term "membrane" or "filter" as used in this disclosure refers to a thin, film-like structure that separates two fluids. It acts as a selective barrier, allowing some particles or chemicals to pass through, but not others. A membrane is a layer of material which serves as a selective barrier between two phases and remains impermeable to specific particles, molecules, or substances when exposed to the action of a driving force. Some components are allowed passage by the membrane into a permeate stream, whereas others are retained by it and accumulate in the retentate stream.

Membranes can be utilized in a cross flow filtration device as illustrated in FIG. 1. Cross flow filtration involves contacting a feed liquid with a membrane surface while the feed liquid flows across or parallel to the membrane surface. A feed pump and a valve on the retentate stream create a positive trans-membrane pressure that forces a portion of the feed stream to pass through the membrane, forming permeate. Any components of the feed stream than do not pass through the membrane, and remain behind generate the retentate stream. Membrane surface properties including charge and hydrophobicity, membrane polymer type, and membrane pore sizes influence the separation. It is desirable to have sufficient flow velocity past the membrane surface to minimize the membrane fouling rate caused by solids collecting and concentrating near or in the membrane. Available membrane technology includes, but is not limited to, reverse osmosis (RO), nanofiltration (NF), ultrafiltration (UF), and microfiltration (MF). Generally, nanofiltration (NF) is a cross-flow filtration technology which ranges between ultrafiltration (UF) and reverse osmosis (RO). Nanofiltration membranes are typically rated by molecular weight cut-off (MWCO), which is defined as the smallest particle that will pass through a membrance to become permeate where retention of the larger particles is greater than 90%. Nanofiltration MWCO is typically less than about 1000 atomic mass units (daltons). Generally, ultrafiltration (UF) is a cross-flow filtration technology which ranges between nanofiltration (NF) and microfiltration (MF). Ultrafiltration membranes are typically rated by molecular weight cut-off (MWCO). Ultrafiltration MWCO typically ranges from about $10^3$ to about $10^6$ atomic mass units (daltons).

In one embodiment of the invention, the aqueous dispersion (100) is routed to a sulfopolyester concentration zone (150) comprising at least one cross-flow membrane utilized in cross-flow filtration. The cross-flow membrane utilized in the sulfopolyester concentration zone (150) can be an ultrafiltration membrane. The functional selective barrier in the ultrafiltration membrane comprises at least one polymer. The polymer can be selected from the following: polysulfone (PS), polyethersulfone (PES), polyamide (PA), fluoro polymer, cellulosic polymer, and blends of these polymers. The temperature of the aqueous dispersion (100) can range from about 10° C. to about 70° C., about 15° C. to about 70° C., about 20° C. to about 70° C., about 25° C. to about 70° C., about 35° C. to about 70° C., and about 45° C. to about 70° C.

There is no limitation to the volumetric flow of the aqueous dispersion (100).

The configuration of the cross-flow membrane in the sulfopolyester concentration zone (150) can be any that is known in the art. In one embodiment of the invention, at least one cross-flow membrane is contained in at least one spiral membrane cartridge. Multiple spiral membrane cartridges can be utilized in the sulfopolyester concentration zone (150) and can be placed in series.

The recovered water stream (200) comprises water in a weight % greater than the wt. % water in the aqueous dispersion (100). The weight percent of sulfopolyester in the recovered water stream (200) can range from 0 to about 1 wt. %, from 0 to about 0.5 wt. %, from 0 to about 0.1 wt. %, from 0 to about 0.08 wt. %, from 0 to about 0.05 wt. %, from 0 to about 0.04 wt. %, and from 0 to about 0.01 wt. %. In one embodiment, the weight % of sulfopolyester in the recovered water stream (200) is less than 0.02%. The recovered water stream may be recycled, for example, to the process generating the aqueous dispersion.

The concentrated sulfopolyester dispersion (300) comprises sulfopolyester polymer in a weight % greater than the wt. % of sulfopolyester polymer in the aqueous dispersion (100). In other embodiments of the invention, the concentrated sulfopolyester dispersion has a sulfopolyester concentration of at least 2 times that of the aqueous dispersion, a concentration at least 5 times that of the aqueous dispersion, a concentration of at least 10 times that of the aqueous dispersion, a concentration of at least 15 times that of the aqueous dispersion, a concentration of at least 20 times that of the aqueous dispersion, and a concentration at least 30 times that of the aqueous dispersion.

The permeate flux (recovered water stream 200) is defined as the liters/square meter of filter area/hr. The permeate flux rate (recovered water stream 200) generally decreases as the sulfopolyester concentration increases in the aqueous dispersion (100). For example, at 1 wt % sulfopolyester in the aqueous dispersion (100) and 110 psi average pressure utilizing cross flow filtration in the sulfopolyester concentration zone (150), the permeate flux rate (recovered water stream 200) can range from about 50 (L/m²hr) to about 370 (L/m²hr). At 15 wt % sulfopolyester in the aqueous dispersion and 110 psi average pressure utilizing cross flow filtration in the sulfopolyester concentration zone (150), the permeate flux rate (recovered water stream 200) can range from about 30 (L/m²hr) to about 90 (L/m²hr). At 30 wt % sulfopolyester in the aqueous dispersion (100) and 110 psi average pressure utilizing cross flow filtration in the sulfopolyester concentration zone (150), the permeate flux rate (recovered water stream 200) can range from about 16 (L/m²hr) to about 50 (L/m²hr). One object of this invention is to generate a recovered water stream comprising water with a very low concentration of sulfopolyester, such that the recovered water stream can be recycled. In one embodiment of the invention, the weight percent of sulfopolyester in the recovered water stream (200) utilizing a sulfopolyester concentration zone (150) having ultrafiltration membranes ranges from about 0.01 wt. % to about 0.08 wt. %.

The cross flow filtration in the sulfopolyester concentration zone (150) can be accomplished in a batch or continuous fashion. In one embodiment of this invention, the cross flow filtration zone comprises at least one ultrafiltration membrane in a batch operation as illustrated in FIG. 2. An aqueous dispersion (100) is routed to the sulfopolyester concentration zone (150) comprising at least one ultrafiltration membrane. Concentrated sulfopolyester dispersion (300) is recycled to the feed of the sulfopolyester concentration zone (150) until the desired sulfopolyester concentration is reached. The concentrated sulfopolyester dispersion (300) becomes increasing concentrated in sulfopolyester molecules that will not cross the ultrafiltration membrane into the recovered water stream (200).

In another embodiment of this invention, the cross flow filtration in the sulfopolyester concentration zone (150) is accomplished in a continuous membrane filtration system that comprises one or more membrane units in series relative to the flow path as illustrated in FIG. 3. In one embodiment of the invention, each membrane unit comprises at least one ultrafiltration membrane and may contain multiple ultrafiltration membranes in parallel to achieve the desired membrane filtration area needed to accommodate the feed rate of the aqueous dispersion (100). In another embodiment, membrane units downstream of the first membrane unit may comprise membranes other than ultrafiltration membranes. For example, a continuous cross flow filtration unit for the generation of the concentrated sulfopolyester dispersion (300) from the aqueous dispersion (100) can comprise two membrane units in series wherein the first membrane unit comprises at least one ultrafiltration membrane and the second membrane unit comprises at least one nanofiltration membrane. However, embodiments of this invention are not limited to two membrane unit zones. Multiple membrane unit zones may be utilized, and these membrane unit zones can be operated at different pressures.

In one embodiment, a fouled membrane can be regenerated to allow the membrane to be reused. A fouled membrane is defined as a membrane in which the permeate flux (recovered water stream 200) for a given trans membrane pressure has decreased relative to a new membrane by about 5% to about 10%, about 5% to about 15%, about 8% to about 20%, and about 10% to about 30%. The regeneration of the fouled membrane can be accomplished by any method known in the art. In one embodiment of the invention, the regenerating process comprises: (1) flushing the fouled membrane with treated water, (2) circulating an aqueous detergent solution compatible with the membrane; and 3) flushing the membrane with treated water to displace the aqueous detergent solution.

Treated water used to wash the fouled membrane comprises water in which the concentration of monovalent metal cations is less than 1000 ppm, less than 500 ppm, less than 100 ppm, and less than 50 ppm and the concentration of divalent and multivalent cations is less than 50 ppm. In another embodiment of this invention, the concentration of divalent and multivalent cations in the treated water is less than 25 ppm. Acceptable sources of treated water comprise distilled water and deionized water.

In one embodiment of the invention, the aqueous detergent solution comprises at least one anionic detergent and water. The concentration of the anionic detergent in the aqueous detergent solution can range from about 0.1 wt % to about 5 wt %, from about 0.5 wt % to about 4 wt %, from about 1 wt % to about 3 wt %. Typically, the water utilized is treated water as described previously. An example of an anionic detergent is alkylbenzene sulfonate detergents having a $C_{10}$-$C_{16}$ alkyl group. A specific formulation of an aqueous alkylbenzene sulfonate detergent solution comprises the ingredients shown in Table 1.

TABLE 1

| Ingredient | Wt % |
|---|---|
| Water | 40-60% |
| Sodium ($C_{10}$-$C_{16}$) Alkylbenzene Sulfonate | 10-20% |
| Alcohol Ethoxylate | 1-5% |
| Coconut Diethyanolamide | 1-5% |
| Sodium Xylene Sulfonate | 2-7% |
| Tripotassium EDTA | 1-5% |

Commercial examples of aqueous detergent solutions or detergents that can be utilized to produce aqueous detergent solutions include, but are not limited to, Liqui-Nox® detergent and Alconox® detergent obtained from Alconox Company in White Plains, N.Y.

The regenerating process for a fouled membrane can be conducted at a temperature ranging from about 20° C. to about 70° C. or from about 40° C. to about 60° C. The first step of the membrane cleaning procedure comprises displacing sulfopolyester concentrate with deionized water. Next, the fouled surface of the membrane is contacted with an aqueous anionic detergent with a residence time sufficient to recover at least about 80% of the original clean membrane flux rate. In other embodiments of the invention, the fouled surface of the membrane is contacted with an aqueous anionic detergent for a residence time ranging from about 2 to about 6 hours or from about 3 to about 4 hours.

In one embodiment of the regenerating process, the fouled membrane is regenerated by a process comprising: 1) flushing the fouled membrane with treated water to displace the concentrated sulfopolyester dispersion (300); 2) circulating 1 wt % Liqui-Nox® detergent solution in deionized water for 3 hours at 50° C., (3) flushing the system with treated water to displace the Liqui-Nox® detergent solution, and (4) circulating treated water for 1 hour at 50° C. In another embodiment of the membrane regenerating method, Alconox® detergent is the cleaning agent instead of Liqui-Nox® detergent.

The frequency of membrane regeneration is determined by the decrease in permeate flux rate (recovered water stream 200) over time during operation of the sulfopolyester concentration zone (150) but generally ranges from about 12 hours to about 24 hours, from about 12 hours to about 48 hours, from about 12 hours to about 72 hours, and from about 12 hours to about 100 hours.

At least a portion of the sulfopolyester in the concentrated sulfopolyester dispersion can be recovered. In one embodiment according to the present invention, the recovery step comprises evaporation of water from the concentrated sulfopolyester dispersion. The evaporation process may include the application of heat and/or a vacuum to the concentrated sulfopolyester dispersion in order to drive off water. As a significant amount of water has been removed by nanofiltration, the energy costs for performing this recovery step have been greatly reduced. Sufficient water is removed to further concentrate the sulfopolyester in the concentrated sulfopolyester dispersion, or the water is entirely removed thereby leaving only dry polymer, essentially. The level to which the water is removed will depend upon the particular article being manufactured with the recovered sulfopolyester. For example, the sulfopolyester may be used in water dispersible adhesives. In this regard, sufficient water should be removed to achieve a sulfopolyester level of at least about 50 weight %. If a solid recovered sulfopolyester product is desired, the recovered material should comprise greater than 99 weight % sulfopolyester. The solid recovered sulfopolyester product may be processed further, as necessary, to render it suitable for manufacturing a particular article or product.

In another embodiment according to the present invention, the sulfopolyester may be recovered by precipitation of at least a portion of the sulfopolyester in the concentrated sulfopolyester dispersion. There exists several procedures through which the sulfopolyester can be precipitated. And while most of these procedures can be employed using aqueous dispersions of sulfopolyesters that are dilute, they are generally most effective when used with a concentrated sulfopolyester dispersion comprising greater than about 10 weight % of sulfopolyester.

One recovery mechanism generally pertains to precipitation of sulfopolyester with a salt solution. The use of monovalent cations is preferred as divalent cations tend to crosslink the polyester. Examples of monovalent salts include, but are not limited to, potassium salts, sodium salts, lithium salts, and mixtures thereof. Other examples of monovalent salts include, but are not limited to, potassium acetate, sodium acetate, potassium sulfate, sodium sulfate and mixtures thereof. The salt may be added to the sulfopolyester concentrate as a solid or as an aqueous solution. In one embodiment, the salt level in the concentrated sulfopolyester dispersion is at least about 30 weight %, based on the weight of the sulfopolyester. In other embodiments of the invention, the salt level is between about 30 to about 60 weight % and between about 40 to about 50 weight %, based on the weight of the sulfopolyester. While a single salt may be used, a blend of potassium and sodium salts can be utilized in a weight ratio of about 5:1 to about 1:5, a weight ratio of about 2.5:1 to about 1:2.5, and a weight ratio of about 1:1.

After addition of the salt to the concentrated sulfopolyester dispersion, the concentrated sulfopolyester dispersion may gel. The concentrated sulfopolyester dispersion may then be heated to between about 50° to about 80° C. with stirring to break the gel. The concentrated sulfopolyester dispersion can then be cooled to room temperature and filtered to yield the recovered sulfopolyester. At this point, the recovered sulfopolyester may include significant quantities of salt. It may be desirable to remove this salt, depending upon the manufacturing process in which the recovered sulfopolyester is to be reused. Salt removal is generally done by washing the recovered sulfopolyester in water, for example, deionized water as minerals present in tap water, especially the divalent cations Ca and Fe, may cause the recovered sulfopolyester to crosslink and become brittle. It may be necessary to wash the recovered sulfopolyester multiple times to ensure that the salt is removed. In other embodiments, the salt level remaining in the recovered sulfopolyester is less than about 2 weight %, less than about 1 weight %, and less than about 0.5 weight %. In another embodiment, the recovered sulfopolyester can be essentially salt-free. After washing, the recovered sulfopolyester can be dried.

Another mechanism for recovery of the sulfopolyester by precipitation is with the use of a non-solvent. For example, the non-solvent is miscible with water such as an alcohol, such as, isopropanol. The non-solvent causes the sulfopolyester to precipitate, after which the sulfopolyester is recovered by filtration and washed in deionized water to remove the alcohol to produce the recovered sulfopolyester. Care should be taken to remove any trapped alcohol from the recovered sulfopolyester in that any alcohol residues may affect the reuse of the sulfopolyester. Also, this mechanism was found to work well with sulfopolyester samples having inherent viscosities greater than about 0.30. However, with low inherent viscosity materials, the sulfopolyester may dissolve in the non-solvent and therefore become unrecoverable.

The present invention results in a sulfopolyester recovery yield of at least about 50% by weight, more preferably at least about 70% by weight, and most preferably at least about 90% by weight of the sulfopolyester present in the aqueous dispersion.

Finally, the recovered sulfopolyester is reused in a manufacturing process. Exemplary uses for the recovered sulfopolyester include the formation of articles or products such as non-woven fabric, multicomponent fibers, films, adhesives, and clothing.

The methods described herein advantageously tend not to degrade the sulfopolyester polymer such that the recovered sulfopolyester exhibits an average molecular weight of at least about 50% of the molecular weight of the sulfopolyester present in the aqueous dispersion. More preferably, the recovered sulfopolyester retains at least about 75% of its original molecular weight, and most preferably at least about 90%.

In another embodiment of the present invention, a concentrated sulfopolyester dispersion comprising at least about 10 weight % of a sulfopolyester is provided. A concentrated sulfopolyester dispersion comprising at least 20 weight % and at least 30 weight % of sulfopolyester is also provided. This concentrated sulfopolyester dispersion may be formed in accordance with any of those methods described above and may comprise any sulfopolyester previously described herein. In other embodiments, the concentrated sulfopolyester dispersion comprises between about 10 to about 65 weight %, between about 15 to about 60 weight %, between about 20 to about 55 weight %, between about 25 to about 50 weight percent, and between about 30 to about 45 weight percent of a sulfopolyester.

The recovered sulfopolyester of the present invention can be utilized to produce an article. Non-limiting examples of such articles include multifilament fibers, yarns, cords, tapes, fabrics, melt blown webs, spunbonded webs, thermobonded webs, hydroentangled webs, nonwoven webs and fabrics, and combinations thereof; items having one or more layers of fibers, such as, for example, multilayer nonwovens, laminates, and composites from such fibers, gauzes, bandages, diapers, training pants, tampons, surgical gowns and masks, feminine napkins; and the like. Further, the articles may include replacement inserts for various personal hygiene and cleaning products. The article of the present invention may be bonded, laminated, attached to, or used in conjunction with other materials which may or may not be water-dispersible. The article, for example, a nonwoven fabric layer, may be bonded to a flexible plastic film or backing of a water non-dispersible material, such as polyethylene. Such an assembly, for example, could be used as one component of a disposable diaper. In addition, the article may result from overblowing fibers onto another substrate to form highly assorted combinations of engineered melt blown, spunbond, film, or membrane structures.

EXAMPLES

This invention can be further illustrated by the following examples of preferred embodiments thereof, although it will be understood that these examples are included merely for purposes of illustration and are not intended to limit the scope of the invention unless otherwise specifically indicated.

EXAMPLES

All experiments were completed using commercially available membranes shown in Table 2 and a M20 cross-flow membrane unit from Alfa Laval. The M20 cross-flow unit allowed screening of multiple flat sheet membranes simultaneously. Sulfopolyester dispersions of 15 wt % and 30 wt % solids were produced in the lab using distilled water. A 1 wt % sulfopolyester dispersion was produced by diluting the higher solids dispersions. A Lauda E630 circulating bath was connected to a heat exchanger to maintain temperature during the experiments.

TABLE 2

| Alfa Laval Membranes Evaluated | | |
|---|---|---|
| Membrane | MWCO[1] | Description |
| ETNA01PP | 1000 | Fluoro Polymer, (hydrophobic) |
| GR95PP | 2000 | Polyethersulphone, (hydrophilic) |
| UFX5pHT | 5000 | Polysulphone, (hydrophilic) |
| GR81PP | 10000 | Polyethersulphone, (hydrophilic) |
| ETNA10PP | 10000 | Fluoro Polymer, (hydrophobic) |
| UFX10pHT | 10000 | Polysulphone, (hydrophilic) |

TABLE 2-continued

Alfa Laval Membranes Evaluated

| Membrane | MWCO[1] | Description |
|---|---|---|
| GR61PP | 20000 | Polysulphone, (hydrophilic) |
| GR51PP | 50000 | Polysulphone, (hydrophilic) |
| NF99HF | 400 | Polyamide, (hydrophobic) |

[1]Molecular weight cut off

The following procedure was utilized in all of the examples. One set of flat sheet membranes from each type was installed in the M20 resulting in groups of 2-4 membrane sets per experiment. The area for each set of membranes was 0.035 m². New membranes were flushed with deionized water for about 1 hr at 40° C. prior to use. For each set of membranes, flux versus pressure was determined using deionized water. Flux is a measure of rate/unit area expressed as L/m²*hr. All rate experiments were conducted at ~40° C. The pump rate was held at 11 L/min for most of the experiments, and a limited number of experiments were conducted at 18 L/min. Permeate flux vs. pressure was measured using 1 wt %, 15 wt % and 30 wt % sulfopolyester dispersions.

Once the rate experiments were completed, studies to determine the effect of sulfopolyester dispersion concentration on the rate of fouling were conducted. Fouling experiments were conducted as follows: 1) a sulfopolyester dispersion of known concentration was charged to the feed vessel, 2) the experimental conditions were set (pump rate, pressure and temperature), and 3) the M20 cross-flow membrane unit operated on full recycle (permeate and retentate returned to the feed vessel). Periodically, the permeation rate for each membrane was measured and recorded. The duration of the experiments was 24-96 hrs. Once each experiment was completed, the feed vessel was drained, a cleaning cycle was completed to remove fouling, and the water flux was measured to evaluate the cleaning procedure. For many processes utilizing a cross-flow filtration process, a cleaning process that restores performance cycle after cycle is desirable. The manufacturer recommends weak caustic for cleaning the membranes so the initial studies were completed using 0.1 M sodium hydroxide; however, subsequent studies examined Alconox and Liqui-Nox manufactured by Alconox Company in New York. Generally, manufacturers suggest cleaning on a daily basis which results in increased downtime for a system, so experiments were completed to examine the frequency that cleaning was needed to maintain performance in order to produce the primary polymer concentrate.

Example 1

Permeate flux (Recovered Water Stream 200) at 1 wt % Sulfopolyester in Feed Stream (Aqueous Dispersion 100)

Figure 4:
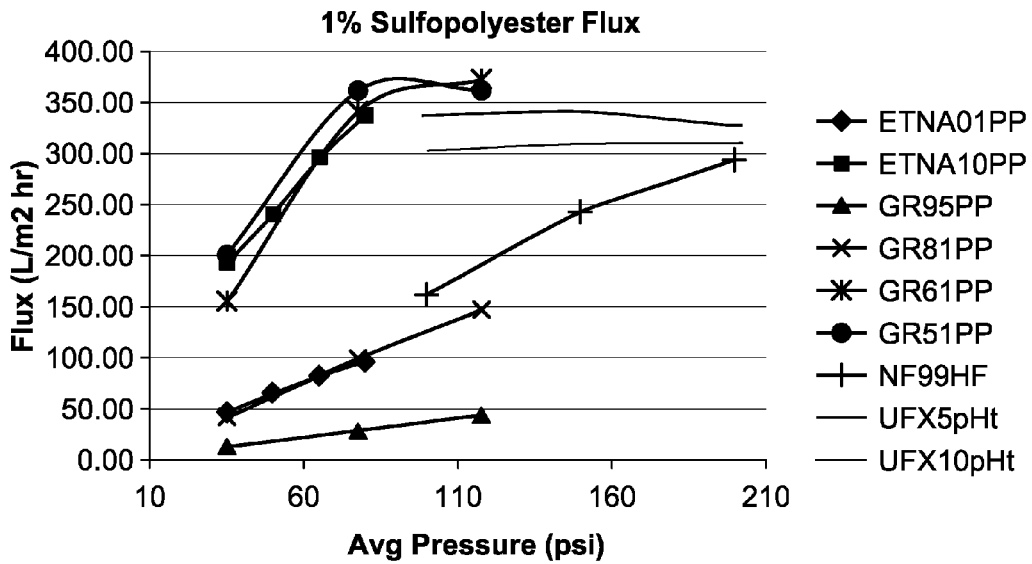
FIGS. 4-7 show the flux (L/m2 hr) for particular ultrafiltration membranes at 1 wt %, 15 wt %, and 30 wt % sulfopolyester concentration in the aqueous dispersion (100).

Flux was determined for each of the membranes listed previously with an 1 wt % sulfopolyester dispersion. Data are illustrated in FIG. 4. All membranes tested were fresh and unused. It is clear to see that ultrafiltration membranes affected the desired separation of permeate. Five of the ultra-filtration membranes exhibited a higher flux at a lower pressure than the control NF99HF nano-filtration membrane.

Example 2

Permeate Flux (Recovered Water Stream 200) at 15 wt % Sulfopolyester in Feed Stream (Aqueous Dispersion 100)

Figure 5:
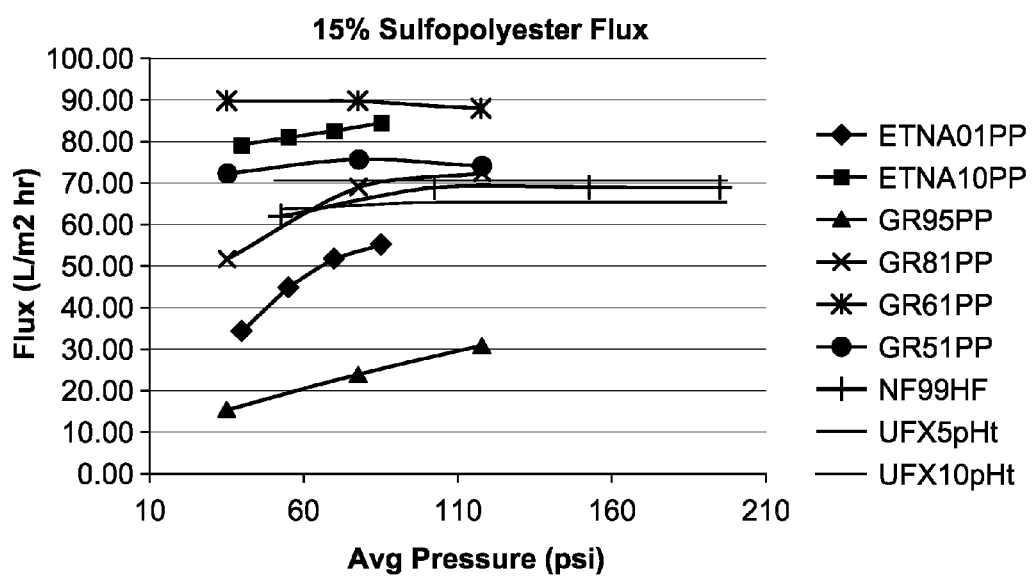

Flux was determined for each of the membranes listed previously with 15 wt % sulfopolyester. Data are illustrated in FIG. 5. It is clear to see that ultrafiltration membranes affected the desired separation of permeate. Five of the ultrafiltration membranes exhibited a higher flux at a lower pressure than the control NF99HF nanofiltration membrane.

Example 3

Permeate Flux (Recovered Water Stream 200) at 30 wt % Sulfopolyester in Feed Stream (Aqueous Dispersion 100)

Figure 6:
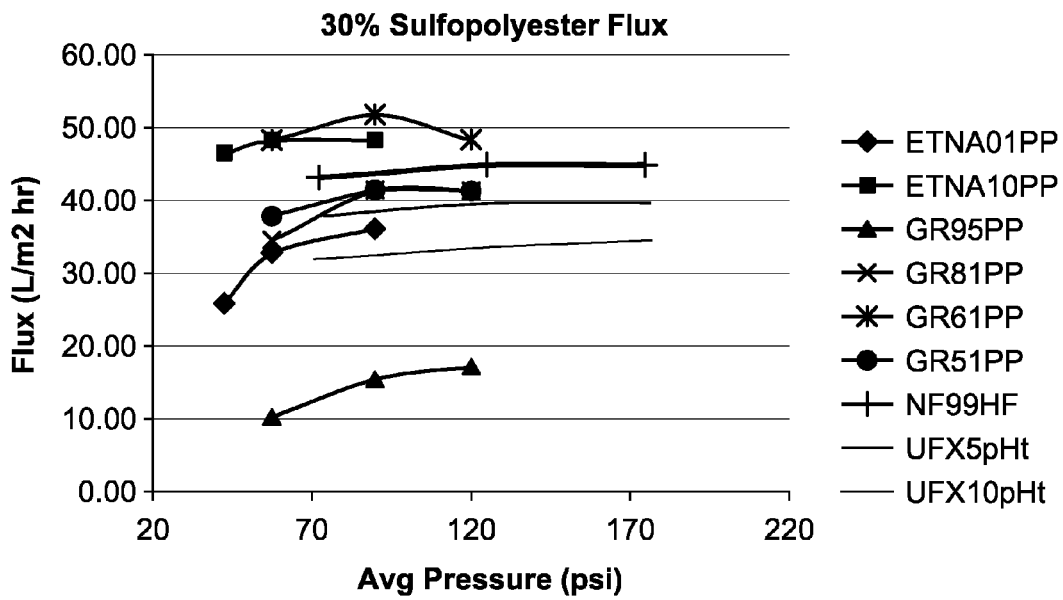

Permeate flux was determined for each of the membranes listed previously with 30 wt % sulfopolyester. Data are illustrated in FIG. 6. It is clear to see that ultrafiltration membranes can affect the desired separation of permeate. Two of the ultrafiltration membranes exhibited a higher flux at a lower pressure than the NF99HF nanofiltration membrane.

Figure 7:
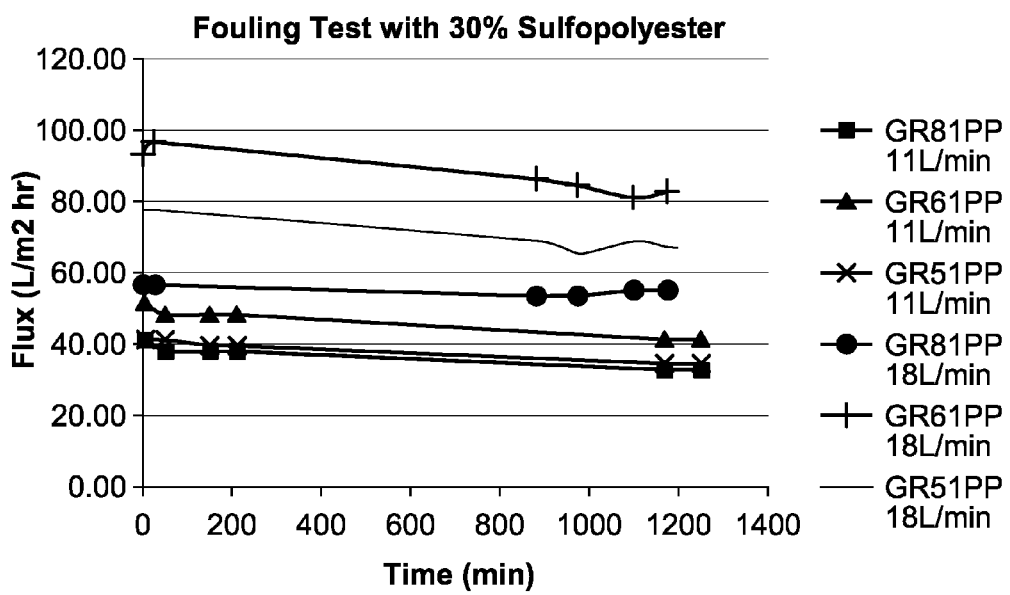
Figure 8:
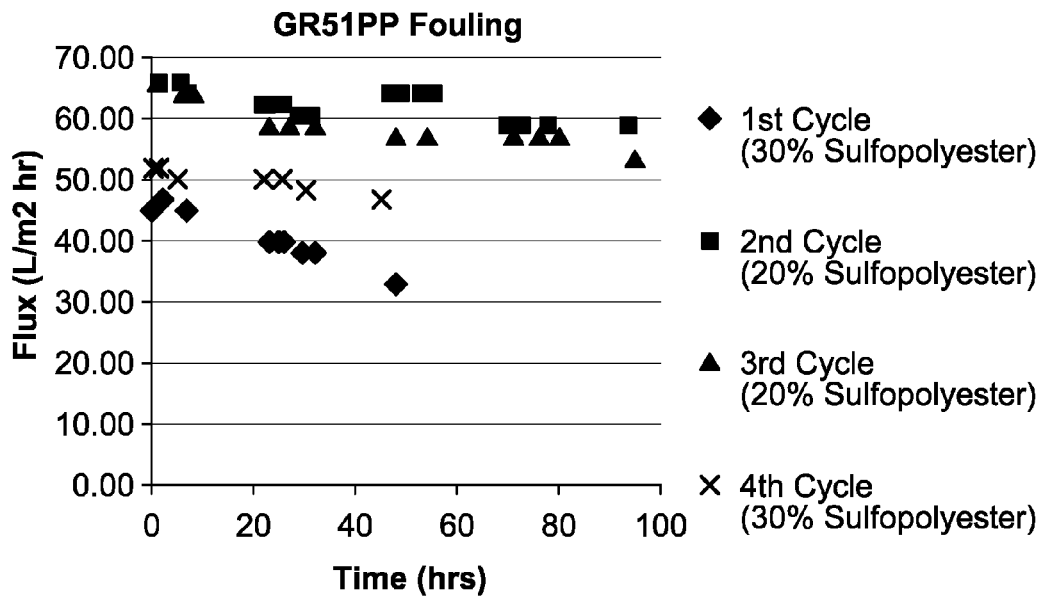
FIGS. 8-11 show fouling studies for particular ultrafiltration membranes.
Figure 9:
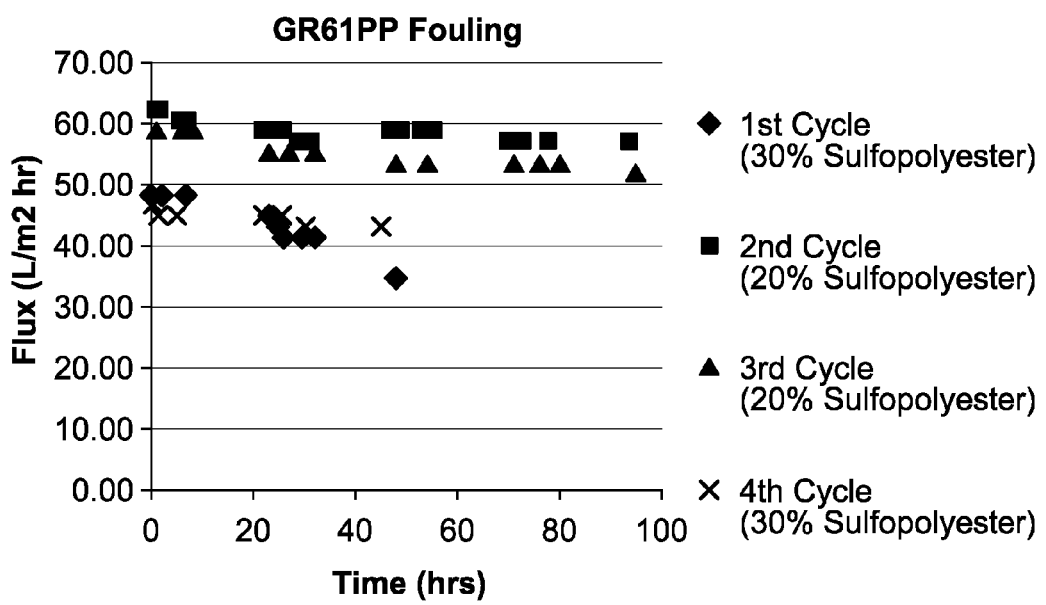
Figure 10:
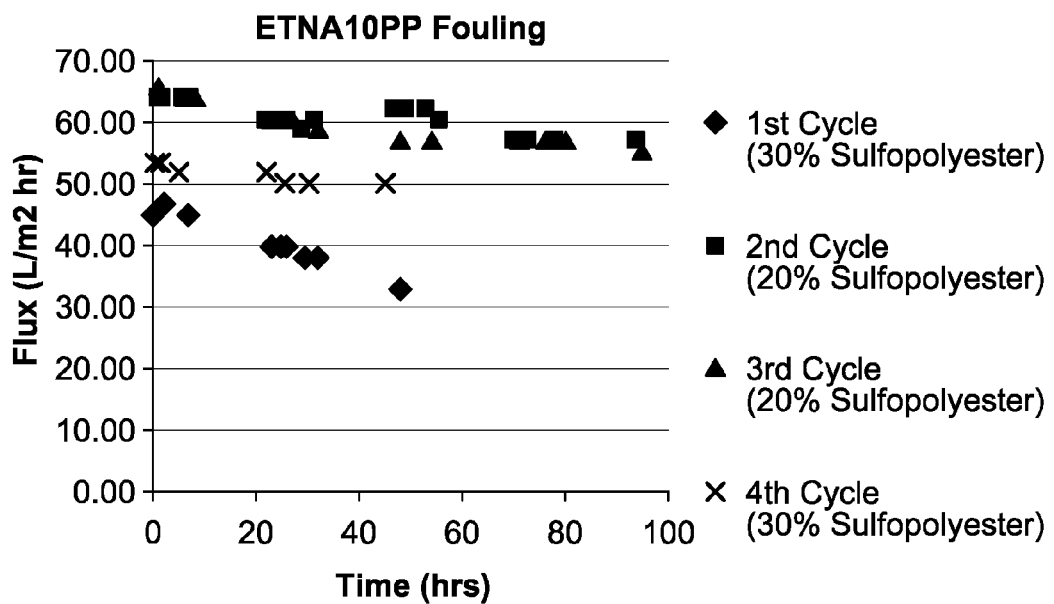
Figure 11:
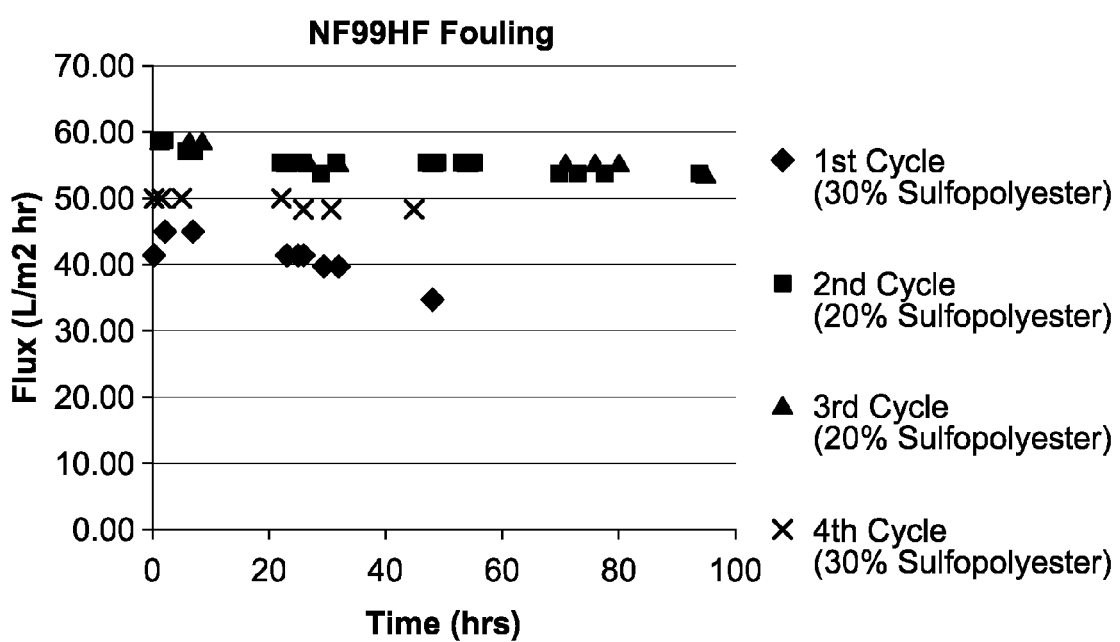

To allow for comparison with the data presented in Examples 1-3, the average pressure for this experiment was ~80 psi. The effect was significant with flux increases of 50% or greater at the higher flow rate (FIG. 7).

Example 4

Determination of Membrane Fouling Rates

Extensive fouling studies were conducted using four membranes selected on the basis of flux performance: GR51 PP, GR61 PP, ETNA1 OPP, and NF99HF. Multiple fouling cycles were completed for this group of membranes using 20 wt % and 30 wt % sulfopolyester dispersions. Between fouling cycles, a cleaning cycle was conducted, and water flux was compared to results for the new membranes. If the water flux was not within 80-100% of the water flux rate for a new membrane, the cleaning procedure was repeated. Note that fouling cycles were performed at sulfopolyester concentrations of 20 wt % and 30 wt %. All experiments were run at a constant flow rate (11 L/min), temperature (40° C.) and average pressure (40 psi).

Within the group of membranes tested, performance was very similar both in flux and rate of fouling. At a 20 wt % sulfopolyester concentration of the sulfopolyester dispersion (aqueous dispersion (100)) flux dropped about 20% after 96 hours of run time. At a 30% sulfopolyester concentration of the sulfopolyester dispersion (aqueous dispersion (100)), flux dropped about 20% after 48 hours of run time.

Experiment 5

Regeneration of Fouled Membranes

During the initial membrane screening experiments, three detergents were evaluated: 0.1M sodium hydroxide, 0.1% Alconox® detergent obtained from Alconox Company in New York, and 0.1% Liqui-Nox® detergent also obtained from Alconox Company in New York. 0.1 M sodium hydroxide is the standard membrane wash reagent recommended by Alfa Laval. In addition to the detergents, temperature and rinse time were evaluated. The regeneration or cleaning experiment started with a distilled water flush followed by circulation of the detergent, and then final deionized water flush to remove the detergent. Temperatures as high as 70° C. were evaluated; however, due evidence of possible membrane damage, the cleaning temperature was set at 50° C. After preliminary experiments, Liqui-Nox® was chosen as the detergent. Examination of the membranes following experiments using 0.1 M sodium hydroxide revealed the presence of precipitated material thought to comprise sulfopolyester. This can be a negative outcome because solids can accumulate and irreversibly foul the membrane. It was determined that the standard vendor recommended detergent was not acceptable for cleaning fouled membranes used to concentrate the sulfopolyester dispersion. A dilute solution of Liqui-Nox® detergent for this application was utilized because it performs well and is more easily diluted in water compared to the Alconox® detergent. FIGS. 8-11 show the results of the regeneration experiments conducted during the fouling studies. Following each fouling/cleaning cycle, water flux vs. pressure was determined to evaluate the effectiveness of the regeneration procedure. Within the group of membranes tested, performance was very similar both in flux and rate of fouling. At a 20 wt % sulfopolyester concentration, flux dropped about 20% after 96 hours of run time. At a 30 wt % sulfopolyester concentration, flux dropped about 20% after 48 hours of run time. The volumetric flow rate of the cleaning solution in FIG. 7 contacting the membrane surface is recorded in (l/min) for the cleaning of 0.105 square meters of membrane area.

That which is claimed is:

1. A process for recovering a concentrated sulfopolyester dispersion comprising routing an aqueous dispersion comprising a water-dispersible sulfopolyester to a sulfopolyester concentration zone to remove water from said aqueous dispersion to produce said concentrated sulfopolyester dispersion and a recovered water stream; wherein said sulfopolyester concentration zone comprises at least one ultrafiltration membrane; wherein said ultrafiltration membrane comprises polysulphone and wherein said ultrafiltration membrane has a molecular weight cut-off of between about 20,000 to about 50,000 atomic mass units.

2. The process for recovering a concentrated sulfopolyester dispersion according to claim 1 wherein said sulfopolyester in said aqueous dispersion ranges from about 0.25 wt. % to about 25 wt. %.

3. The process for recovering a concentrated sulfopolyester dispersion according to claim 1 wherein said sulfopolyester in said aqueous dispersion ranges from about 0.5 wt. % to about 10 wt. %.

4. The process for recovering a concentrated sulfopolyester dispersion according to claim 1 wherein said aqueous dispersion is formed by washing an article comprising said water-dispersible sulfopolyester in water.

5. The process for recovering a concentrated sulfopolyester dispersion according to claim 1 wherein said sulfopolyester concentration zone comprises a cross flow filtration device.

6. The process for recovering a concentrated sulfopolyester dispersion according to claim 1 wherein the temperature of said aqueous dispersion ranges from about 10° C. to about 70° C.

7. The process for recovering a concentrated sulfopolyester dispersion according to claim 1 wherein said sulfopolyester concentration zone comprises at least one ultrafiltration membrane followed by at least one nanofiltration membrane.

8. The process for recovering a concentrated sulfopolyester dispersion according to claim 1 wherein said ultrafiltration membrane in said sulfopolyester concentration zone is contained in at least one spiral membrane cartridge.

9. The process for recovering a concentrated sulfopolyester dispersion according to claim 1 wherein the weight percent of sulfopolyester in said recovered water stream ranges from 0 to about 1 wt. %.

10. The process for recovering a concentrated sulfopolyester dispersion according to claim 1 wherein said concentrated sulfopolyester dispersion has a sulfopolyester concentration of at least 2 times that of said aqueous dispersion.

11. The process for recovering a concentrated sulfopolyester dispersion according to claim 10 wherein said concentrated sulfopolyester dispersion has a sulfopolyester concentration of at least 5 times that of said aqueous dispersion.

12. The process for recovering a concentrated sulfopolyester dispersion according to claim 5 wherein said cross flow filtration device in the sulfopolyester concentration zone is operated in batch or continuous mode.

13. The process for recovering a concentrated sulfopolyester dispersion according to claim 1 further comprising recycling at least a portion of said concentrated sulfopolyester dispersion to said sulfopolyester concentration zone to increase the water-dispersible sulfopolyester concentration of said concentrated sulfopolyester dispersion.

14. The process for recovering a concentrated sulfopolyester dispersion according to claim 1 further comprising recovering at least a portion of said sulfopolyester from said concentrated sulfopolyester dispersion to produce a recovered sulfopolyester polymer.

* * * * *